United States Patent
Hellman

(10) Patent No.: US 11,868,540 B2
(45) Date of Patent: *Jan. 9, 2024

(54) DETERMINATION OF RESONANT FREQUENCY AND QUALITY FACTOR FOR A SENSOR SYSTEM

(71) Applicant: Cirrus Logic International Semiconductor Ltd., Edinburgh (GB)

(72) Inventor: Ryan Hellman, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 589 days.

This patent is subject to a terminal disclaimer.

(21) Appl. No.: 17/096,598

(22) Filed: Nov. 12, 2020

(65) Prior Publication Data

US 2021/0405764 A1 Dec. 30, 2021

Related U.S. Application Data

(60) Provisional application No. 63/086,721, filed on Oct. 2, 2020, provisional application No. 63/044,065, filed on Jun. 25, 2020.

(51) Int. Cl.
*G06F 3/02* (2006.01)
*G01L 1/14* (2006.01)
(Continued)

(52) U.S. Cl.
CPC .......... *G06F 3/0202* (2013.01); *G01L 1/005* (2013.01); *G01L 1/14* (2013.01); *G01L 1/162* (2013.01); *G01L 1/183* (2013.01)

(58) Field of Classification Search
CPC ........ G06F 17/10; G06F 3/016; G06F 3/0202; H04B 1/71055; H04B 1/7105;
(Continued)

(56) References Cited

U.S. PATENT DOCUMENTS 1,090,820 A * 3/1914 You et al. ............... F23G 5/16
110/158
4,268,822 A 5/1981 Olsen
(Continued)

FOREIGN PATENT DOCUMENTS

CN 10542884 A 3/2016
CN 106471708 A 3/2017
(Continued)

OTHER PUBLICATIONS

International Search Report and Written Opinion of the International Searching Authority, International Application No. PCT/US2022/018886, dated Jun. 10, 2022.
(Continued)

*Primary Examiner* — Vinh P Nguyen
(74) *Attorney, Agent, or Firm* — Jackson Walker L.L.P

(57) ABSTRACT

A method for determining sensor parameters of an actively-driven sensor system may include obtaining as few as three samples of a measured physical quantity versus frequency for the actively-driven sensor system, performing a refinement operation to provide a refined version of the sensor parameters based on the as few as three samples and based on a linear model of an asymmetry between slopes of the measured physical quantity versus frequency between pairs of the as few as three samples, iteratively repeating the refinement operation until the difference between successive refined versions of the sensor parameters is below a defined threshold, and outputting the refined sensor parameters as updated sensor parameters for the actively-driven sensor system.

36 Claims, 12 Drawing Sheets

(51) Int. Cl.
　　*G01L 1/00*　　　(2006.01)
　　*G01L 1/18*　　　(2006.01)
　　*G01L 1/16*　　　(2006.01)

(58) Field of Classification Search
　　CPC .............. H04B 1/7107; H04B 1/71052; H04B
　　　　　　1/71072; H04B 7/10; H04L 25/03331;
　　　　　　H04L 1/005; H04L 25/03216; H04L
　　　　　25/0262; H04L 25/03178; H04L 25/0246;
　　　　　H04L 25/0242; H04L 2025/03611; H04L
　　　　　25/03318; G01L 1/005; G01L 1/14; G01L
　　　　　　1/162; G01L 1/183; G01L 25/00; G01L
　　　　　　27/002; G01R 31/3648; G01R 31/367;
　　　　　G01R 31/3842; G01R 1/30; G01R 15/14;
　　　　　　G01R 15/144; G01R 19/2513; G01R
　　　　　　23/20; G01R 31/007; G01R 31/2884;
　　　　　　　　G01R 31/389; G01R 31/396
　　See application file for complete search history.

(56) References Cited

U.S. PATENT DOCUMENTS

| | | | |
|---|---|---|---|
| 4,888,554 | A | 12/1989 | Hyde et al. |
| 5,286,941 | A | 2/1994 | Bel |
| 5,361,184 | A | 11/1994 | El-Sharkawi et al. |
| 5,567,920 | A | 10/1996 | Watanabe et al. |
| 5,661,269 | A | 8/1997 | Fukuzaki et al. |
| 5,715,529 | A | 2/1998 | Kianush et al. |
| 5,898,136 | A | 4/1999 | Katsurahira |
| 6,231,520 | B1 | 5/2001 | Maezawa |
| 6,283,859 | B1 | 9/2001 | Carlson et al. |
| 6,380,923 | B1 | 4/2002 | Fukumoto et al. |
| 6,473,708 | B1 | 10/2002 | Watkins et al. |
| 7,173,410 | B1 | 2/2007 | Pond |
| 7,965,276 | B1 | 6/2011 | Martin et al. |
| 8,144,126 | B2 | 3/2012 | Wright |
| 8,174,352 | B2 | 5/2012 | Parpia et al. |
| 8,346,487 | B2 | 1/2013 | Wright et al. |
| 8,384,378 | B2 | 2/2013 | Feldkamp et al. |
| 8,421,446 | B2 | 4/2013 | Straubinger et al. |
| 8,428,889 | B2 | 4/2013 | Wright |
| 8,457,915 | B2 * | 6/2013 | White ..................... G01C 3/08 |
| | | | 250/341.1 |
| 8,674,950 | B2 | 3/2014 | Olson |
| 8,970,230 | B2 | 3/2015 | Narayanasamy et al. |
| 9,070,856 | B1 | 6/2015 | Rose et al. |
| 9,164,605 | B1 | 10/2015 | Pirogov et al. |
| 9,707,502 | B1 | 7/2017 | Bonifas et al. |
| 10,168,855 | B2 | 1/2019 | Baughman et al. |
| 10,372,328 | B2 | 8/2019 | Zhai |
| 10,571,307 | B2 | 2/2020 | Acker |
| 10,599,247 | B2 | 3/2020 | Winokur et al. |
| 10,624,691 | B2 | 4/2020 | Wiender et al. |
| 10,642,435 | B2 | 5/2020 | Maru et al. |
| 10,725,549 | B2 | 7/2020 | Marijanovic et al. |
| 10,726,715 | B2 | 7/2020 | Hwang et al. |
| 10,795,518 | B2 | 10/2020 | Kuan et al. |
| 10,860,202 | B2 * | 12/2020 | Sepehr .................. G06F 3/0412 |
| 10,866,677 | B2 | 12/2020 | Haraikawa |
| 10,908,200 | B2 | 2/2021 | You et al. |
| 10,921,159 | B1 | 2/2021 | Das et al. |
| 10,935,620 | B2 * | 3/2021 | Das ........................ G01R 23/02 |
| 10,942,610 | B2 | 3/2021 | Maru et al. |
| 10,948,313 | B2 | 3/2021 | Kost et al. |
| 11,079,874 | B2 | 8/2021 | Lapointe et al. |
| 11,092,657 | B2 * | 8/2021 | Maru .................... G01D 5/202 |
| 11,093,060 | B2 * | 8/2021 | Yancey ................. G06F 3/046 |
| 11,204,670 | B2 | 12/2021 | Maru et al. |
| 11,294,503 | B2 | 4/2022 | Westerman |
| 11,474,135 | B2 * | 10/2022 | Maru .................... G01D 5/243 |
| 11,507,199 | B2 | 11/2022 | Melanson |
| 11,537,242 | B2 | 12/2022 | Das et al. |
| 11,579,030 | B2 | 2/2023 | Li et al. |
| 11,644,370 | B2 * | 5/2023 | Marchais ................ G01L 1/086 |
| | | | 73/862.381 |

| | | | |
|---|---|---|---|
| 2001/0045941 | A1 | 11/2001 | Rosenberg et al. |
| 2003/0038624 | A1 | 2/2003 | Hilliard et al. |
| 2005/0192727 | A1 | 9/2005 | Shostak et al. |
| 2005/0258826 | A1 | 11/2005 | Kano et al. |
| 2005/0283330 | A1 | 12/2005 | Laraia et al. |
| 2006/0025897 | A1 | 2/2006 | Shostak et al. |
| 2006/0293864 | A1 | 12/2006 | Soss |
| 2007/0047634 | A1 | 3/2007 | Kang et al. |
| 2007/0080680 | A1 | 4/2007 | Schroeder et al. |
| 2007/0198926 | A1 | 8/2007 | Joguet et al. |
| 2007/0268265 | A1 | 11/2007 | XiaoPing |
| 2007/0296593 | A1 | 12/2007 | Hall et al. |
| 2007/0296709 | A1 | 12/2007 | GuangHai |
| 2008/0007534 | A1 | 1/2008 | Peng et al. |
| 2008/0024456 | A1 | 1/2008 | Peng et al. |
| 2008/0088594 | A1 | 4/2008 | Liu et al. |
| 2008/0088595 | A1 | 4/2008 | Liu et al. |
| 2008/0142352 | A1 | 6/2008 | Wright |
| 2008/0143681 | A1 | 6/2008 | XiaoPing |
| 2008/0150905 | A1 | 6/2008 | Grivna et al. |
| 2008/0158185 | A1 | 7/2008 | Westerman |
| 2009/0008161 | A1 | 1/2009 | Jones et al. |
| 2009/0058430 | A1 | 3/2009 | Zhu |
| 2009/0140728 | A1 | 6/2009 | Rollins et al. |
| 2009/0251216 | A1 | 10/2009 | Giotta et al. |
| 2009/0278685 | A1 | 11/2009 | Potyrailo et al. |
| 2009/0302868 | A1 | 12/2009 | Feucht et al. |
| 2009/0308155 | A1 | 12/2009 | Zhang |
| 2010/0019777 | A1 | 1/2010 | Balslink |
| 2010/0045360 | A1 | 2/2010 | Howard et al. |
| 2010/0114505 | A1 | 5/2010 | Wang et al. |
| 2010/0153845 | A1 | 6/2010 | Gregorio et al. |
| 2010/0211902 | A1 | 8/2010 | Unsworth et al. |
| 2010/0231239 | A1 | 9/2010 | Tateishi et al. |
| 2010/0238121 | A1 | 9/2010 | Ely |
| 2010/0328249 | A1 | 12/2010 | Ningrat et al. |
| 2011/0005090 | A1 | 1/2011 | Lee et al. |
| 2011/0214481 | A1 | 9/2011 | Kachanov et al. |
| 2011/0216311 | A1 | 9/2011 | Kachanov et al. |
| 2011/0267302 | A1 | 11/2011 | Fasshauer |
| 2011/0285667 | A1 | 11/2011 | Poupyrev et al. |
| 2011/0291821 | A1 | 12/2011 | Chung |
| 2011/0301876 | A1 | 12/2011 | Yamashita |
| 2013/0018489 | A1 | 1/2013 | Grunthaner et al. |
| 2013/0076374 | A1 | 3/2013 | Huang |
| 2013/0106756 | A1 | 5/2013 | Kono et al. |
| 2013/0106769 | A1 | 5/2013 | Bakken et al. |
| 2013/0269446 | A1 | 10/2013 | Fukushima et al. |
| 2014/0002113 | A1 | 1/2014 | Schediwy et al. |
| 2014/0028327 | A1 | 1/2014 | Potyrailo et al. |
| 2014/0137585 | A1 | 5/2014 | Lu et al. |
| 2014/0225599 | A1 | 8/2014 | Hess |
| 2014/0253107 | A1 | 9/2014 | Roach et al. |
| 2014/0267065 | A1 | 9/2014 | Levesque |
| 2014/0278173 | A1 | 9/2014 | Elia et al. |
| 2015/0022174 | A1 | 1/2015 | Nikitin |
| 2015/0027139 | A1 | 1/2015 | Lin et al. |
| 2015/0077094 | A1 | 3/2015 | Baldwin et al. |
| 2015/0084874 | A1 | 3/2015 | Cheng et al. |
| 2015/0109243 | A1 | 4/2015 | Jun et al. |
| 2015/0293695 | A1 | 10/2015 | Schonleben et al. |
| 2015/0329199 | A1 | 11/2015 | Golborne et al. |
| 2015/0355043 | A1 | 12/2015 | Steeneken et al. |
| 2016/0018940 | A1 | 1/2016 | Lo et al. |
| 2016/0048256 | A1 | 2/2016 | Day |
| 2016/0117084 | A1 | 4/2016 | Ording |
| 2016/0162031 | A1 | 6/2016 | Westerman et al. |
| 2016/0169717 | A1 | 6/2016 | Zhitomirsky |
| 2016/0179243 | A1 | 6/2016 | Schwartz |
| 2016/0231860 | A1 | 8/2016 | Elia |
| 2016/0231874 | A1 | 8/2016 | Baughman et al. |
| 2016/0241227 | A1 | 8/2016 | Hirata |
| 2016/0252403 | A1 | 9/2016 | Murakami |
| 2016/0357296 | A1 | 12/2016 | Picciotto et al. |
| 2017/0077735 | A1 | 3/2017 | Leabman |
| 2017/0093222 | A1 | 3/2017 | Joye et al. |
| 2017/0097437 | A1 | 4/2017 | Widmer et al. |
| 2017/0140644 | A1 | 5/2017 | Hwang et al. |
| 2017/0147068 | A1 | 5/2017 | Yamazaki et al. |

(56) References Cited

U.S. PATENT DOCUMENTS

| | | |
|---|---|---|
| 2017/0168578 A1 | 6/2017 | Tsukamoto et al. |
| 2017/0169674 A1 | 6/2017 | Macours |
| 2017/0184416 A1 | 6/2017 | Kohlenberg et al. |
| 2017/0185173 A1 | 6/2017 | Ito et al. |
| 2017/0187541 A1 | 6/2017 | Sundaresan et al. |
| 2017/0237293 A1 | 8/2017 | Faraone et al. |
| 2017/0242505 A1 | 8/2017 | Vandermeijden et al. |
| 2017/0282715 A1 | 10/2017 | Fung et al. |
| 2017/0315653 A1 | 11/2017 | Vandermeijden et al. |
| 2017/0322643 A1 | 11/2017 | Eguchi |
| 2017/0328740 A1 | 11/2017 | Widmer et al. |
| 2017/0371380 A1 | 12/2017 | Oberhauser et al. |
| 2017/0371381 A1 | 12/2017 | Liu |
| 2017/0371473 A1 | 12/2017 | David et al. |
| 2018/0019722 A1 | 1/2018 | Birkbeck |
| 2018/0020288 A1 | 1/2018 | Risbo et al. |
| 2018/0039331 A1 | 2/2018 | Warren |
| 2018/0055448 A1 | 3/2018 | Karakaya et al. |
| 2018/0059793 A1 | 3/2018 | Hajati |
| 2018/0067601 A1 | 3/2018 | Winokur et al. |
| 2018/0088064 A1 | 3/2018 | Potyrailo et al. |
| 2018/0088702 A1 | 3/2018 | Schutzberg et al. |
| 2018/0097475 A1 | 4/2018 | Djahanshahi et al. |
| 2018/0135409 A1 | 5/2018 | Wilson et al. |
| 2018/0182212 A1 | 6/2018 | Li et al. |
| 2018/0183372 A1 | 6/2018 | Li et al. |
| 2018/0189647 A1 | 7/2018 | Calvo et al. |
| 2018/0195881 A1 | 7/2018 | Acker |
| 2018/0221796 A1 | 8/2018 | Bonifas et al. |
| 2018/0229161 A1 | 8/2018 | Maki et al. |
| 2018/0231485 A1 | 8/2018 | Potyrailo et al. |
| 2018/0260049 A1 | 9/2018 | O'Lionaird et al. |
| 2018/0260050 A1 | 9/2018 | Unseld et al. |
| 2018/0294757 A1 | 10/2018 | Feng et al. |
| 2018/0321748 A1 | 11/2018 | Rao et al. |
| 2018/0364731 A1 | 12/2018 | Liu et al. |
| 2019/0052045 A1 | 2/2019 | Metzger et al. |
| 2019/0179146 A1 | 6/2019 | De Nardi |
| 2019/0197218 A1 | 6/2019 | Schwartz |
| 2019/0204929 A1 | 7/2019 | Attari et al. |
| 2019/0235629 A1 | 8/2019 | Hu et al. |
| 2019/0286263 A1 | 9/2019 | Bagheri et al. |
| 2019/0302161 A1 | 10/2019 | You et al. |
| 2019/0302193 A1 | 10/2019 | Maru et al. |
| 2019/0302890 A1 | 10/2019 | Marijanovic et al. |
| 2019/0302922 A1 | 10/2019 | Das et al. |
| 2019/0302923 A1 | 10/2019 | Maru et al. |
| 2019/0326906 A1 | 10/2019 | Camacho Cardenas et al. |
| 2019/0339313 A1 | 11/2019 | Vandermeijden |
| 2019/0377468 A1 | 12/2019 | Micci et al. |
| 2020/0064952 A1 | 1/2020 | Siemieniec et al. |
| 2020/0064160 A1 | 2/2020 | Maru et al. |
| 2020/0133455 A1 | 4/2020 | Sepehr et al. |
| 2020/0177290 A1 | 6/2020 | Reimer et al. |
| 2020/0191761 A1 | 6/2020 | Potyrailo et al. |
| 2020/0271477 A1 | 8/2020 | Kost et al. |
| 2020/0271706 A1 | 8/2020 | Wardlaw et al. |
| 2020/0271745 A1 | 8/2020 | Das et al. |
| 2020/0272301 A1 | 8/2020 | Duewer et al. |
| 2020/0319237 A1 | 10/2020 | Maru et al. |
| 2020/0320966 A1 | 10/2020 | Clark et al. |
| 2020/0373923 A1 | 11/2020 | Walsh et al. |
| 2020/0382113 A1 | 12/2020 | Beardsworth et al. |
| 2020/0386804 A1 | 12/2020 | Das et al. |
| 2021/0064137 A1 | 3/2021 | Wopat et al. |
| 2021/0140797 A1 | 5/2021 | Kost et al. |
| 2021/0149538 A1 | 5/2021 | LaPointe et al. |
| 2021/0152174 A1 | 5/2021 | Yancey et al. |
| 2021/0361940 A1 | 11/2021 | Yeh et al. |
| 2021/0396610 A1 | 12/2021 | Li et al. |
| 2021/0404901 A1 | 12/2021 | Kost et al. |
| 2021/0405764 A1 | 12/2021 | Hellman et al. |
| 2022/0075500 A1 | 3/2022 | Chang et al. |
| 2022/0268233 A1 | 8/2022 | Kennedy et al. |
| 2022/0307867 A1 | 9/2022 | Das et al. |
| 2022/0308000 A1 | 9/2022 | Das et al. |
| 2022/0404409 A1 | 12/2022 | Maru et al. |

FOREIGN PATENT DOCUMENTS

| | | |
|---|---|---|
| CN | 107076623 A | 8/2017 |
| CN | 209069345 U | 7/2019 |
| CN | 110609610 A | 12/2019 |
| DE | 4004450 A1 | 8/1991 |
| DE | 602004005672 T2 | 12/2007 |
| DE | 102015215330 A1 | 2/2017 |
| DE | 102015215331 A1 | 2/2017 |
| EP | 1697710 B1 | 4/2007 |
| EP | 2682843 A1 | 1/2014 |
| GB | 2394295 A | 4/2004 |
| GB | 2573644 A | 11/2019 |
| GB | 2582065 A | 9/2020 |
| GB | 2582864 A | 10/2020 |
| GB | 2586722 B | 2/2022 |
| JP | 2006246289 A | 9/2006 |
| KR | 20130052059 A | 5/2013 |
| WO | 00/33244 A2 | 6/2000 |
| WO | 20061354832 A2 | 12/2006 |
| WO | 2007068283 A1 | 6/2007 |
| WO | 2016032704 A1 | 3/2016 |
| WO | 2021101722 A1 | 5/2021 |
| WO | 2021101723 A1 | 5/2021 |

OTHER PUBLICATIONS

Combined Search and Examination Report under Sections 17 and 18(3), UKIPO, Application No. GB2201194.4, dated Jul. 1, 2022.
International Search Report and Written Opinion of the International Searching Authority, International Application No. PCT/US2022/018475, dated Aug. 2, 2022.
First Office Action, China National Intellectual Property Administration, Application No. 202010105829.3, dated Apr. 12, 2022, received by counsel Jul. 28, 2022.
Second Office Action, China National Intellectual Property Administration, Application No. 201980022693.5, dated Apr. 13, 2022.
Examination Report under Section 18(3), UKIPO, Application No. GB2015439.9, dated May 10, 2022.
Notice of Preliminary Rejection, Korean Intellectual Property Office, Application No. 10-2020-7029597, dated Jul. 29, 2022.
International Search Report and Written Opinion of the International Searching Authority, International Application No. PCT/US2019/045554, dated Oct. 17, 2019.
Combined Search and Examination Report, UKIPO, Application No. GB1904250.6, dated Sep. 10, 2019.
International Search Report and Written Opinion of the International Searching Authority, International Application No. PCT/US2019/022518, dated May 24, 2019.
International Search Report and Written Opinion of the International Searching Authority, International Application No. PCT/US2019/022578, dated May 27, 2019.
International Search Report and Written Opinion of the International Searching Authority, International Application No. PCT/US2019/021838, dated May 27, 2019.
Combined Search and Examination Report under Sections 17 and 18(3), UKIPO, Application No. GB2001341.3, dated Jun. 29, 2020.
International Search Report and Written Opinion of the International Searching Authority, International Application No. PCT/US2021/035695, dated Sep. 9, 2021.
Second Office Action, China National Intellectual Property Administration, Application No. 201980022689.9, dated Oct. 27, 2021.
Second Office Action, China National Intellectual Property Administration, Application No. 201980022693.5, dated Dec. 14, 2021.
Combined Search and Examination Report under Sections 17 and 18(3), UKIPO, Application No. GB2111666.0, dated Feb. 11, 2022.
Examination Report under Section 18(3), UKIPO, Application No. GB2101804.9, dated Feb. 25, 2022.
International Search Report and Written Opinion of the International Searching Authority, International Application No. PCT/US2022/012721, dated Apr. 26, 2022.

(56) References Cited

OTHER PUBLICATIONS

First Office Action, China National Intellectual Property Administration, Application No. 201980022689.9, dated Jun. 2, 2021.
First Office Action, China National Intellectual Property Administration, Application No. 201980022693.5, dated Jul. 8, 2021.
International Search Report and Written Opinion of the International Searching Authority, International Application No. PCT/US2020/059113, dated Feb. 23, 2021.
International Search Report and Written Opinion of the International Searching Authority, International Application No. PCT/US2020/059101, dated Mar. 9, 2021.
First Office Action, China National Intellectual Property Administration, Application No. 202080080853.4, dated Feb. 22, 2023.
Combined Search and Examination Report under Sections 17 and 18(3), United Kingdom Intellectual Property Office, Application No. GB2215005.6, dated Apr. 11, 2023.
Gao, Shuo, et al., Piezoelectric vs. Capactivie Based Force Sensing in Capacitive Touch Panels, IEEE Access, vol. 4, Jul. 14, 2016.
Second Office Action, China National Intellectual Property Administration, Application No. 201980054799.3, dated May 24, 2023.
First Office Action, China Intellectual Property Administration, Application No. 202180043659.3, dated Sep. 8, 2023.
Combined Search and Examination Report, United Kingdom Intellectual Property Office, Application No. GB2313599.9, dated Oct. 9, 2023.

\* cited by examiner

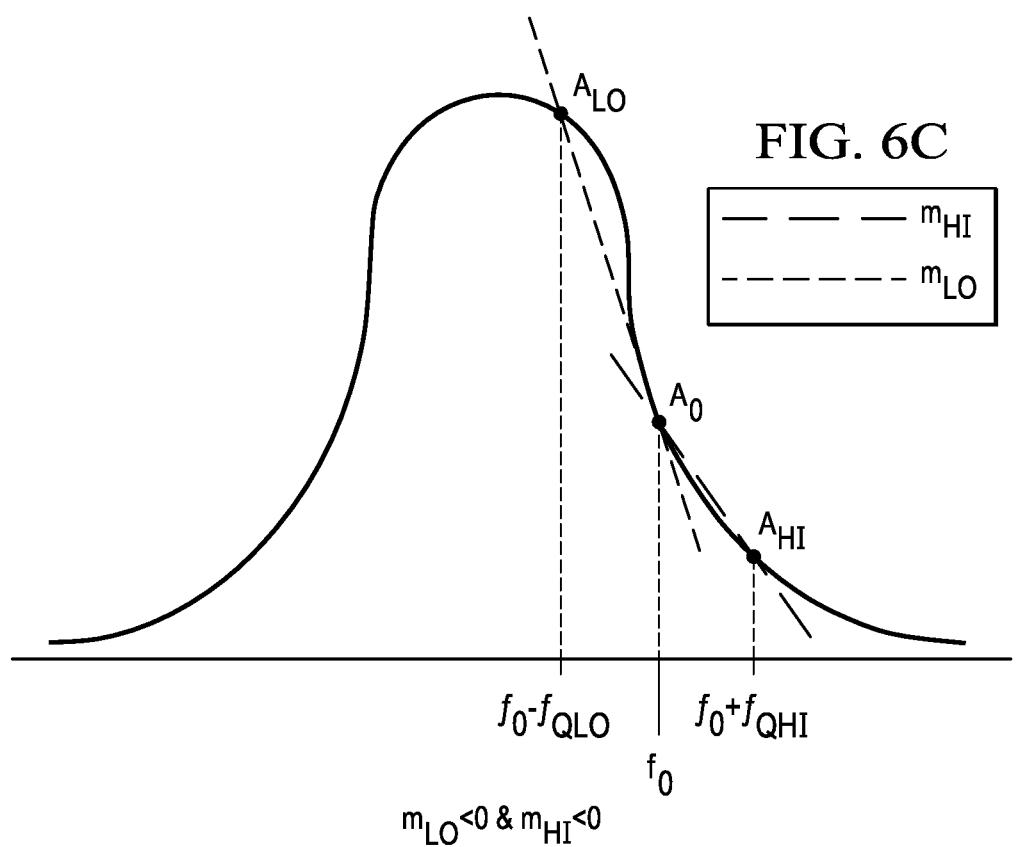

DETERMINATION OF RESONANT FREQUENCY AND QUALITY FACTOR FOR A SENSOR SYSTEM

RELATED APPLICATIONS

The present disclosure claims priority to U.S. Provisional Patent Application Ser. No. 63/044,065, filed Jun. 25, 2020, and U.S. Provisional Patent Application Ser. No. 63/086,721, filed Oct. 2, 2020, both of which are incorporated by reference herein in their entireties. The present disclosure also relates to U.S. patent application Ser. No. 16/267,079, filed Feb. 4, 2019, U.S. patent application Ser. No. 16/422,543, filed May 24, 2019, U.S. patent application Ser. No. 16/866,175, filed May 4, 2020, and U.S. patent application Ser. No. 17/079,709, filed Oct. 26, 2020, all of which are incorporated by reference herein in their entireties.

FIELD OF DISCLOSURE

The present disclosure relates in general to electronic devices with user interfaces (e.g., mobile devices, game controllers, instrument panels, etc.), and more particularly, an integrated haptic system for use in a system for mechanical button replacement in a mobile device, for use in haptic feedback for capacitive sensors, and/or other suitable applications.

BACKGROUND

Many traditional mobile devices (e.g., mobile phones, personal digital assistants, video game controllers, etc.) include mechanical buttons to allow for interaction between a user of a mobile device and the mobile device itself. However, such mechanical buttons are susceptible to aging, wear, and tear that may reduce the useful life of a mobile device and/or may require significant repair if malfunction occurs. Also, the presence of mechanical buttons may render it difficult to manufacture mobile devices to be waterproof. Accordingly, mobile device manufacturers are increasingly looking to equip mobile devices with virtual buttons that act as a human-machine interface allowing for interaction between a user of a mobile device and the mobile device itself. Similarly, mobile device manufacturers are increasingly looking to equip mobile devices with other virtual interface areas (e.g., a virtual slider, interface areas of a body of the mobile device other than a touch screen, etc.). Ideally, for best user experience, such virtual interface areas should look and feel to a user as if a mechanical button or other mechanical interface were present instead of a virtual button or virtual interface area.

Presently, linear resonant actuators (LRAs) and other vibrational actuators (e.g., rotational actuators, vibrating motors, etc.) are increasingly being used in mobile devices to generate vibrational feedback in response to user interaction with human-machine interfaces of such devices. Typically, a sensor (traditionally a force or pressure sensor) detects user interaction with the device (e.g., a finger press on a virtual button of the device) and in response thereto, the linear resonant actuator may vibrate to provide feedback to the user. For example, a linear resonant actuator may vibrate in response to user interaction with the human-machine interface to mimic to the user the feel of a mechanical button click.

However, there is a need in the industry for sensors to detect user interaction with a human-machine interface, wherein such sensors provide acceptable levels of sensor sensitivity, power consumption, and size. For example, in an actively driven sensor system, it may be desirable that a signal driver generate a driving signal at or near a resonant frequency of the sensor. Due to manufacturing designs and tolerances as well as environmental effects (such as temperature, humidity, movements in air gap over time), the resonant frequency of the sensor as well as the Q-factor of the sensor may be different for each individual sensor and can change over time. Thus, to ensure generation of a driving signal at or near such resonant frequency, it may further be desirable to determine such resonant frequency and/or a quality factor of a sensor.

SUMMARY

In accordance with the teachings of the present disclosure, the disadvantages and problems associated with use of a virtual button in a mobile device may be reduced or eliminated.

In accordance with embodiments of the present disclosure, a method for determining sensor parameters of an actively-driven sensor system may include obtaining as few as three samples of a measured physical quantity versus frequency for the actively-driven sensor system, performing a refinement operation to provide a refined version of the sensor parameters based on the as few as three samples and based on a linear model of an asymmetry between slopes of the measured physical quantity versus frequency between pairs of the as few as three samples, iteratively repeating the refinement operation until the difference between successive refined versions of the sensor parameters is below a defined threshold, and outputting the refined sensor parameters as updated sensor parameters for the actively-driven sensor system.

In accordance with embodiments of the present disclosure, a system may include an actively-driven sensor and a measurement circuit communicatively coupled to the actively-driven sensor and configured to obtain as few as three samples of a measured physical quantity versus frequency for the actively-driven sensor system, perform a refinement operation to provide a refined version of the sensor parameters based on the as few as three samples and based on a linear model of an asymmetry between slopes of the measured physical quantity versus frequency between pairs of the as few as three samples, iteratively repeat the refinement operation until the difference between successive refined versions of the sensor parameters is below a defined threshold, and output the refined sensor parameters as updated sensor parameters for the actively-driven sensor system.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 6A-6C illustrate additional example graphs of amplitude versus frequency for a resistive-inductive-capacitive sensor in different possible amplitude response regions, in accordance with embodiments of the present disclosure;

DETAILED DESCRIPTION

Figure 1:
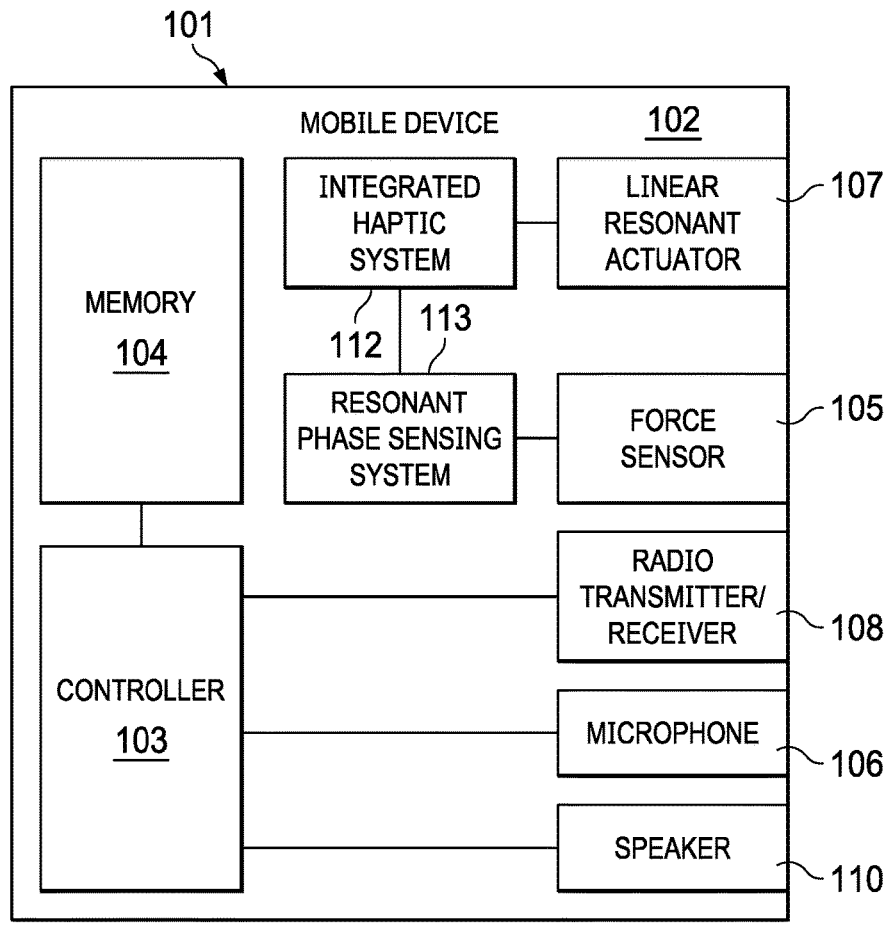
FIG. 1 illustrates a block diagram of selected components of an example mobile device, in accordance with embodiments of the present disclosure.

FIG. 1 illustrates a block diagram of selected components of an example mobile device 102, in accordance with embodiments of the present disclosure. As shown in FIG. 1, mobile device 102 may comprise an enclosure 101, a controller 103, a memory 104, a force sensor 105, a microphone 106, a linear resonant actuator 107, a radio transmitter/receiver 108, a speaker 110, an integrated haptic system 112, and a resonant phase sensing system 113.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102.

Controller 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 103 interprets and/or executes program instructions and/or processes data stored in memory 104 and/or other computer-readable media accessible to controller 103.

Memory 104 may be housed within enclosure 101, may be communicatively coupled to controller 103, and may include any system, device, or apparatus configured to retain program instructions and/or data for a period of time (e.g., computer-readable media). Memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Microphone 106 may be housed at least partially within enclosure 101, may be communicatively coupled to controller 103, and may comprise any system, device, or apparatus configured to convert sound incident at microphone 106 to an electrical signal that may be processed by controller 103, wherein such sound is converted to an electrical signal using a diaphragm or membrane having an electrical capacitance that varies as based on sonic vibrations received at the diaphragm or membrane. Microphone 106 may include an electrostatic microphone, a condenser microphone, an electret microphone, a microelectromechanical systems (MEMs) microphone, or any other suitable capacitive microphone.

Radio transmitter/receiver 108 may be housed within enclosure 101, may be communicatively coupled to controller 103, and may include any system, device, or apparatus configured to, with the aid of an antenna, generate and transmit radio-frequency signals as well as receive radio-frequency signals and convert the information carried by such received signals into a form usable by controller 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to controller 103, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a cylindrical magnetic gap. When an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

Force sensor 105 may be housed within enclosure 101, and may include any suitable system, device, or apparatus for sensing a force, a pressure, or a touch (e.g., an interaction with a human finger) and generating an electrical or electronic signal in response to such force, pressure, or touch. In some embodiments, such electrical or electronic signal may be a function of a magnitude of the force, pressure, or touch applied to the force sensor. In these and other embodiments, such electronic or electrical signal may comprise a general purpose input/output signal (GPIO) associated with an input signal to which haptic feedback is given. Force sensor 105 may include, without limitation, a capacitive displacement sensor, an inductive force sensor (e.g., a resistive-inductive-capacitive sensor), a strain gauge, a piezoelectric force sensor, force sensing resistor, piezoelectric force sensor, thin film force sensor, or a quantum tunneling composite-based force sensor. For purposes of clarity and exposition in this disclosure, the term "force" as used herein may refer not only to force, but to physical quantities indicative of force or analogous to force, such as, but not limited to, pressure and touch.

Linear resonant actuator 107 may be housed within enclosure 101, and may include any suitable system, device, or apparatus for producing an oscillating mechanical force across a single axis. For example, in some embodiments, linear resonant actuator 107 may rely on an alternating current voltage to drive a voice coil pressed against a moving mass connected to a spring. When the voice coil is driven at the resonant frequency of the spring, linear resonant actuator 107 may vibrate with a perceptible force. Thus, linear resonant actuator 107 may be useful in haptic applications within a specific frequency range. While, for the purposes of clarity and exposition, this disclosure is described in relation to the use of linear resonant actuator 107, it is understood that any other type or types of vibrational actuators (e.g., eccentric rotating mass actuators) may be used in lieu of or in addition to linear resonant actuator 107. In addition, it is also understood that actuators arranged to produce an oscillating mechanical force across multiple axes may be used in lieu of or in addition to linear resonant actuator 107. As described elsewhere in this disclosure, a linear resonant actuator 107, based on a signal received from integrated haptic system 112, may render haptic feedback to a user of mobile device 102 for at least one of mechanical button replacement and capacitive sensor feedback.

Integrated haptic system 112 may be housed within enclosure 101, may be communicatively coupled to force sensor 105 and linear resonant actuator 107, and may include any system, device, or apparatus configured to receive a signal from force sensor 105 indicative of a force applied to mobile device 102 (e.g., a force applied by a human finger to a virtual button of mobile device 102) and generate an electronic signal for driving linear resonant actuator 107 in response to the force applied to mobile device 102. Detail of an example integrated haptic system in accordance with embodiments of the present disclosure is depicted in FIG. 2.

Resonant phase sensing system 113 may be housed within enclosure 101, may be communicatively coupled to force sensor 105 and linear resonant actuator 107, and may include any system, device, or apparatus configured to detect a displacement of a mechanical member (e.g., mechanical member 305 depicted in FIGS. 3A and 3B, below) indicative of a physical interaction (e.g., by a user of mobile device 102) with the human-machine interface of mobile device 102 (e.g., a force applied by a human finger to a virtual interface of mobile device 102). As described in greater detail below, resonant phase sensing system 113 may detect displacement of such mechanical member by performing resonant phase sensing of a resistive-inductive-capacitive sensor for which an impedance (e.g., inductance, capacitance, and/or resistance) of the resistive-inductive-capacitive sensor changes in response to displacement of the mechanical member. Thus, displacement of the mechanical member may cause a change in an impedance of a resistive-inductive-capacitive sensor integral to resonant phase sensing system 113. Resonant phase sensing system 113 may also generate an electronic signal to integrated haptic system 112 to which integrated haptic system 112 may respond by driving linear resonant actuator 107 in response to a physical interaction associated with a human-machine interface associated with the mechanical member. Detail of an example resonant phase sensing system 113 in accordance with embodiments of the present disclosure is depicted in greater detail below.

Although specific example components are depicted above in FIG. 1 as being integral to mobile device 102 (e.g., controller 103, memory 104, force sensor 105, microphone 106, radio transmitter/receiver 108, speakers(s) 110), a mobile device 102 in accordance with this disclosure may comprise one or more components not specifically enumerated above. For example, although FIG. 1 depicts certain user interface components, mobile device 102 may include one or more other user interface components in addition to those depicted in FIG. 1 (including but not limited to a keypad, a touch screen, and a display), thus allowing a user to interact with and/or otherwise manipulate mobile device 102 and its associated components.

Figure 2:
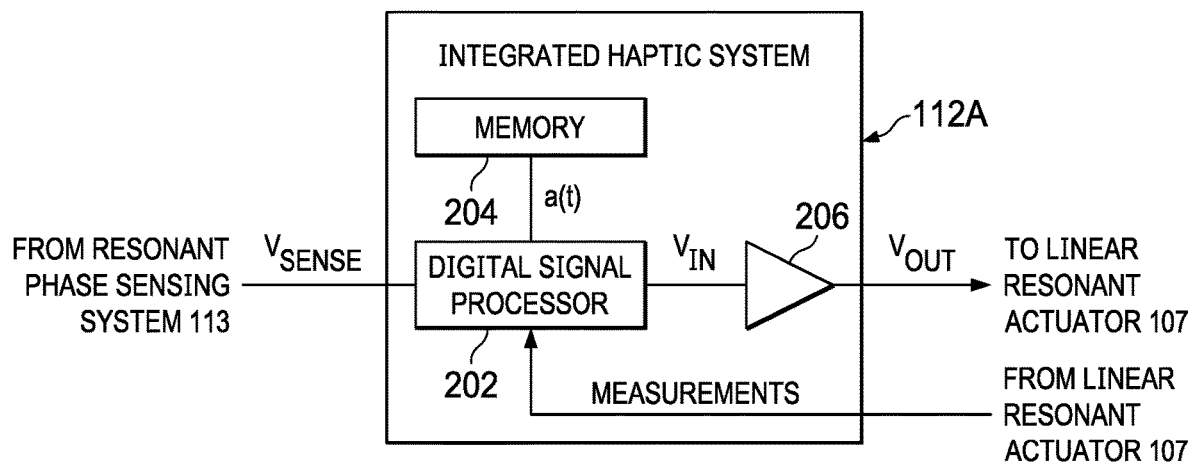
FIG. 2 illustrates a block diagram of selected components of an example integrated haptic system, in accordance with embodiments of the present disclosure.

FIG. 2 illustrates a block diagram of selected components of an example integrated haptic system 112A, in accordance with embodiments of the present disclosure. In some embodiments, integrated haptic system 112A may be used to implement integrated haptic system 112 of FIG. 1. As shown in FIG. 2, integrated haptic system 112A may include a digital signal processor (DSP) 202, a memory 204, and an amplifier 206.

DSP 202 may include any system, device, or apparatus configured to interpret and/or execute program instructions and/or process data. In some embodiments, DSP 202 may interpret and/or execute program instructions and/or process data stored in memory 204 and/or other computer-readable media accessible to DSP 202.

Memory 204 may be communicatively coupled to DSP 202, and may include any system, device, or apparatus configured to retain program instructions and/or data for a period of time (e.g., computer-readable media). Memory 204 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Amplifier 206 may be electrically coupled to DSP 202 and may comprise any suitable electronic system, device, or apparatus configured to increase the power of an input signal $V_{IN}$ (e.g., a time-varying voltage or current) to generate an output signal Vou-r. For example, amplifier 206 may use electric power from a power supply (not explicitly shown) to increase the amplitude of a signal. Amplifier 206 may include any suitable amplifier class, including without limitation, a Class-D amplifier.

In operation, memory 204 may store one or more haptic playback waveforms. In some embodiments, each of the one or more haptic playback waveforms may define a haptic response a(t) as a desired acceleration of a linear resonant actuator (e.g., linear resonant actuator 107) as a function of time. DSP 202 may be configured to receive a force signal $V_{SENSE}$ from resonant phase sensing system 113 indicative of force applied to force sensor 105. Either in response to receipt of force signal $V_{SENSE}$ indicating a sensed force or independently of such receipt, DSP 202 may retrieve a haptic playback waveform from memory 204 and process such haptic playback waveform to determine a processed haptic playback signal $V_{IN}$. In embodiments in which amplifier 206 is a Class D amplifier, processed haptic playback signal $V_{IN}$ may comprise a pulse-width modulated signal. In response to receipt of force signal $V_{SENSE}$ indicating a sensed force, DSP 202 may cause processed haptic playback signal $V_{IN}$ to be output to amplifier 206, and amplifier 206 may amplify processed haptic playback signal $V_{IN}$ to generate a haptic output signal $V_{OUT}$ for driving linear resonant actuator 107.

In some embodiments, integrated haptic system 112A may be formed on a single integrated circuit, thus enabling lower latency than existing approaches to haptic feedback control. By providing integrated haptic system 112A as part of a single monolithic integrated circuit, latencies between various interfaces and system components of integrated haptic system 112A may be reduced or eliminated.

Figure 3A:
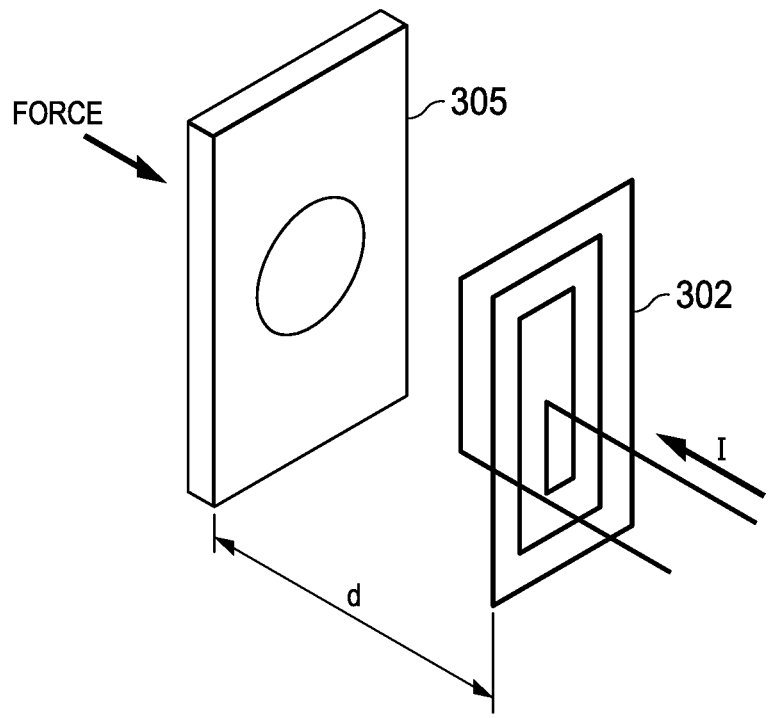
FIG. 3A illustrates a mechanical member separated by a distance from an inductive coil, in accordance with embodiments of the present disclosure.

FIG. 3A illustrates a mechanical member 305 embodied as a metal plate separated by a distance d from an inductive coil 302, in accordance with embodiments of the present disclosure. Mechanical member 305 may comprise any suitable system, device, or apparatus which all or a portion thereof may displace, wherein such displacement affects an electrical property (e.g., inductance, capacitance, etc.) of the mechanical member 305 or another electrical component in electrical communication (e.g., via a mutual inductance) with mechanical member 305.

Figure 3B:
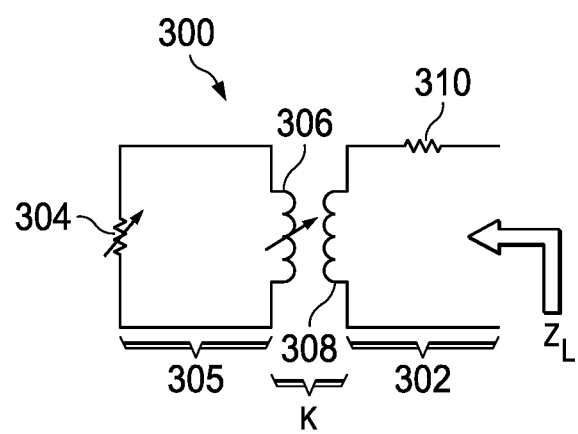
FIG. 3B illustrates selected components of an inductive sensing system that may be implemented by a resonant phase sensing system, in accordance with embodiments of the present disclosure.

FIG. 3B illustrates selected components of an inductive sensing system 300 that may be implemented by force sensor 105 and/or resonant phase sensing system 113, in accordance with embodiments of the present disclosure. As shown in FIG. 3B, inductive sensing system 300 may include mechanical member 305, modeled as a variable electrical resistance 304 and a variable electrical inductance 306, and may include inductive coil 302 in physical proximity to mechanical member 305 such that inductive coil 302 has a mutual inductance with mechanical member 305 defined by a variable coupling coefficient k. As shown in FIG. 3B, inductive coil 302 may be modeled as a variable electrical inductance 308 and a variable electrical resistance 310.

In operation, as a current I flows through inductive coil 302, such current may induce a magnetic field which in turn may induce an eddy current inside mechanical member 305. When a force is applied to and/or removed from mechanical member 305, which alters distance d between mechanical member 305 and inductive coil 302, the coupling coefficient k, variable electrical resistance 304, and/or variable electrical inductance 306 may also change in response to the change in distance. These changes in the various electrical parameters may, in turn, modify an effective impedance $Z_L$ of inductive coil 302.

Figure 4:
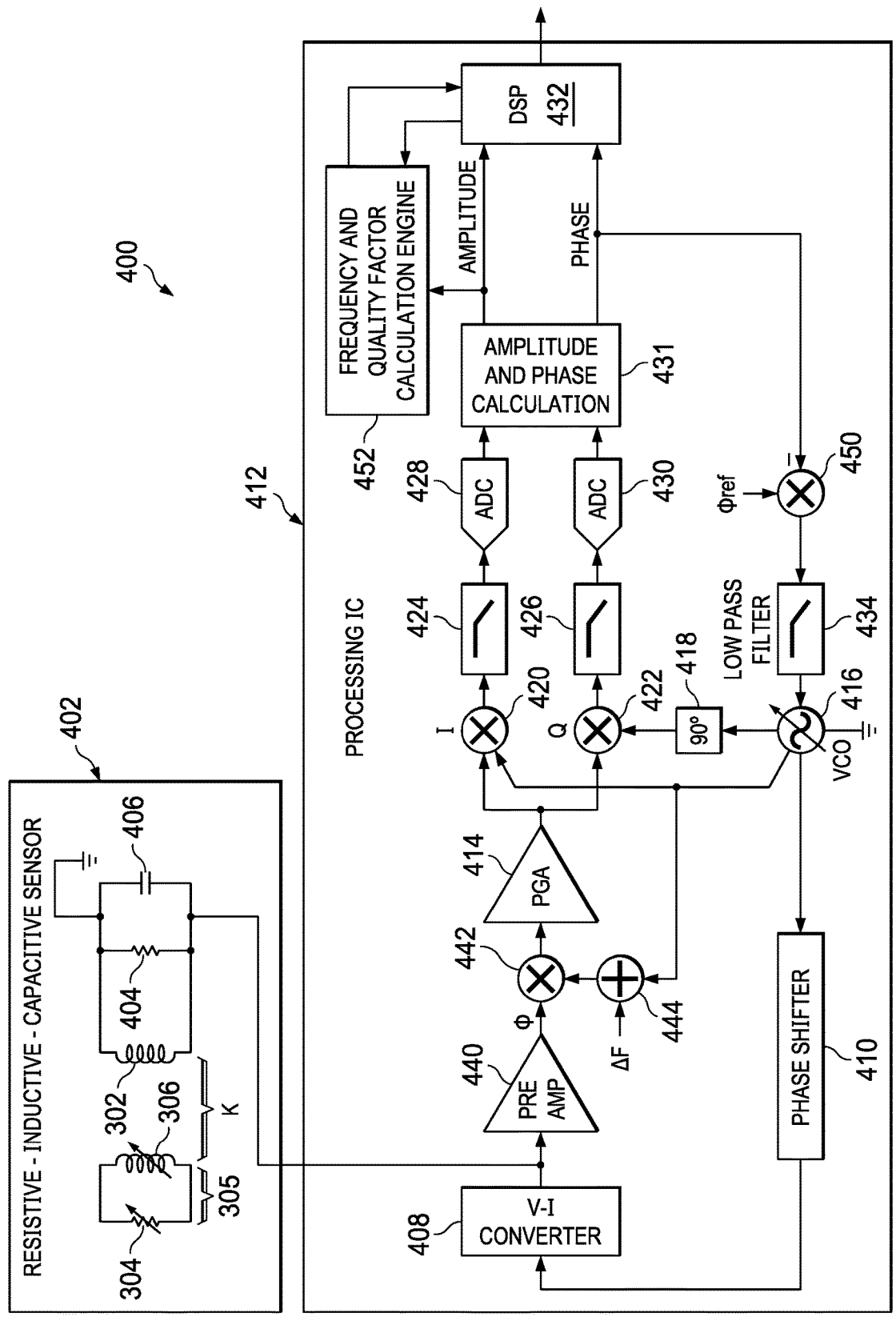
FIG. 4 illustrates a diagram of selected components of an example system for performing resonant phase sensing, in accordance with embodiments of the present disclosure.

FIG. 4 illustrates a diagram of selected components of an example system 400 for performing resonant phase sensing, in accordance with embodiments of the present disclosure. In some embodiments, system 400 may be used to implement resonant phase sensing system 113 of FIG. 1. As shown in FIG. 4, system 400 may include a resistive-inductive-capacitive sensor 402 and a processing integrated circuit (IC) 412. In some embodiments, resistive-inductive-capacitive sensor 402 may implement all or a portion of force sensor 105 and processing integrated circuit (IC) 412 may implement all or a portion of resonant phase sensing system 113.

As shown in FIG. 4, resistive-inductive-capacitive sensor 402 may include mechanical member 305, inductive coil 302, a resistor 404, and capacitor 406, wherein mechanical member 305 and inductive coil 302 have a variable coupling coefficient k. Although shown in FIG. 4 to be arranged in parallel with one another, it is understood that inductive coil 302, resistor 404, and capacitor 406 may be arranged in any other suitable manner that allows resistive-inductive-capacitive sensor 402 to act as a resonant tank. For example, in some embodiments, inductive coil 302, resistor 404, and capacitor 406 may be arranged in series with one another. In some embodiments, resistor 404 may not be implemented with a stand-alone resistor, but may instead be implemented by a parasitic resistance of inductive coil 302, a parasitic resistance of capacitor 406, and/or any other suitable parasitic resistance.

Processing IC 412 may be communicatively coupled to resistive-inductive-capacitive sensor 402 and may comprise any suitable system, device, or apparatus configured to implement a measurement circuit to measure phase information associated with resistive-inductive-capacitive sensor 402 and based on the phase information, determine a displacement of mechanical member 305 relative to resistive-inductive-capacitive sensor 402. Thus, processing IC 412 may be configured to determine an occurrence of a physical interaction (e.g., press or release of a virtual button) associated with a human-machine interface associated with mechanical member 305 based on the phase information.

As shown in FIG. 4, processing IC 412 may include a phase shifter 410, a voltage-to-current converter 408, a preamplifier 440, an intermediate frequency mixer 442, a combiner 444, a programmable gain amplifier (PGA) 414, a voltage-controlled oscillator (VCO) 416, a phase shifter 418, an amplitude and phase calculation block 431, a DSP 432, a low-pass filter 434, a combiner 450, and a frequency and quality factor calculation engine 452. Processing IC 412 may also include a coherent incident/quadrature detector implemented with an incident channel comprising a mixer 420, a low-pass filter 424, and an analog-to-digital converter (ADC) 428, and a quadrature channel comprising a mixer 422, a low-pass filter 426, and an ADC 430 such that processing IC 412 is configured to measure the phase information using the coherent incident/quadrature detector.

Phase shifter 410 may include any system, device, or apparatus configured to detect an oscillation signal generated by processing IC 412 (as explained in greater detail below) and phase shift such oscillation signal (e.g., by 45 degrees) such that at a normal operating frequency of system 400, an incident component of a sensor signal ϕ generated by preamplifier 440 is approximately equal to a quadrature component of sensor signal ϕ, so as to provide common mode noise rejection by a phase detector implemented by processing IC 412, as described in greater detail below.

Voltage-to-current converter 408 may receive the phase shifted oscillation signal from phase shifter 410, which may be a voltage signal, convert the voltage signal to a corresponding current signal, and drive the current signal on resistive-inductive-capacitive sensor 402 at a driving frequency with the phase-shifted oscillation signal in order to generate sensor signal ϕ which may be processed by processing IC 412, as described in greater detail below. In some embodiments, a driving frequency of the phase-shifted oscillation signal may be selected based on a resonant frequency of resistive-inductive-capacitive sensor 402 (e.g., may be approximately equal to the resonant frequency of resistive-inductive-capacitive sensor 402).

Preamplifier 440 may receive sensor signal ϕ and condition sensor signal ϕ for frequency mixing, with mixer 442, to an intermediate frequency Δf combined by combiner 444 with an oscillation frequency generated by VCO 416, as described in greater detail below, wherein intermediate frequency Δf is significantly less than the oscillation frequency. In some embodiments, preamplifier 440, mixer 442, and combiner 444 may not be present, in which case PGA 414 may receive sensor signal ϕ directly from resistive-inductive-capacitive sensor 402. However, when present, preamplifier 440, mixer 442, and combiner 444 may allow for mixing sensor signal ϕ down to a lower intermediate frequency Δf which may allow for lower-bandwidth and more efficient ADCs and/or which may allow for minimization of phase and/or gain mismatches in the incident and quadrature paths of the phase detector of processing IC 412.

In operation, PGA 414 may further amplify sensor signal ϕ to condition sensor signal ϕ for processing by the coherent incident/quadrature detector. VCO 416 may generate an oscillation signal to be used as a basis for the signal driven by voltage-to-current converter 408, as well as the oscillation signals used by mixers 420 and 422 to extract incident and quadrature components of amplified sensor signal ϕ. As shown in FIG. 4, mixer 420 of the incident channel may use an unshifted version of the oscillation signal generated by VCO 416, while mixer 422 of the quadrature channel may use a 90-degree shifted version of the oscillation signal phase shifted by phase shifter 418. As mentioned above, the oscillation frequency of the oscillation signal generated by VCO 416 may be selected based on a resonant frequency of resistive-inductive-capacitive sensor 402 (e.g., may be approximately equal to the resonant frequency of resistive-inductive-capacitive sensor 402).

In the incident channel, mixer 420 may extract the incident component of amplified sensor signal ϕ, low-pass filter 424 may filter out the oscillation signal mixed with the amplified sensor signal ϕ to generate a direct current (DC) incident component, and ADC 428 may convert such DC incident component into an equivalent incident component digital signal for processing by amplitude and phase calculation block 431. Similarly, in the quadrature channel, mixer 422 may extract the quadrature component of amplified sensor signal ϕ, low-pass filter 426 may filter out the phase-shifted oscillation signal mixed with the amplified sensor signal ϕ to generate a direct current (DC) quadrature component, and ADC 430 may convert such DC quadrature component into an equivalent quadrature component digital signal for processing by amplitude and phase calculation block 431.

Amplitude and phase calculation block 431 may include any system, device, or apparatus configured to receive phase information comprising the incident component digital signal and the quadrature component digital signal and based thereon, extract amplitude and phase information.

DSP 432 may include any system, device, or apparatus configured to interpret and/or execute program instructions and/or process data. In particular, DSP 432 may receive the phase information and the amplitude information generated by amplitude and phase calculation block 431 and based thereon, determine a displacement of mechanical member 305 relative to resistive-inductive-capacitive sensor 402, which may be indicative of an occurrence of a physical interaction (e.g., press or release of a virtual button or other interaction with a virtual interface) associated with a human-machine interface associated with mechanical member 305 based on the phase information. DSP 432 may also generate an output signal indicative of the displacement. In some embodiments, such output signal may comprise a control signal for controlling mechanical vibration of linear resonant actuator 107 in response to the displacement.

The phase information generated by amplitude and phase calculation block 431 may be subtracted from a reference phase $\phi_{ref}$ by combiner 450 in order to generate an error signal that may be received by low-pass filter 434. Low-pass filter 434 may low-pass filter the error signal, and such filtered error signal may be applied to VCO 416 to modify the frequency of the oscillation signal generated by VCO 416, in order to drive sensor signal ϕ towards reference phase $\phi_{ref}$. As a result, sensor signal ϕ may comprise a transient decaying signal in response to a "press" of a virtual button (or other interaction with a virtual interface) associated with system 400 as well as another transient decaying signal in response to a subsequent "release" of the virtual button (or other interaction with a virtual interface). Accordingly, low-pass filter 434 in connection with VCO 416 may implement a feedback control loop that may track changes in operating parameters of system 400 by modifying the driving frequency of VCO 416.

Frequency and quality factor calculation engine 452 may comprise any system, device, or apparatus configured to, as described in greater detail below, calculate a resonant frequency $f_0$ and/or a quality factor Q associated with resistive-inductive-capacitor sensor 402, such as those caused by drift of physical parameters (e.g., aging, temperature, etc.) of force sensor 105, mechanical member 305, resonant phase sensing system 113, etc.

Although FIG. 4 depicts that, in some embodiments, frequency and quality factor calculation engine 452 is external to DSP 432, in some embodiments, functionality of frequency and quality factor calculation engine 452 may be implemented in whole or part by DSP 432.

Although the foregoing contemplates use of closed-loop feedback for sensing of displacement, the various embodiments represented by FIG. 4 may be modified to implement an open-loop system for sensing of displacement. In such an open-loop system, a processing IC may include no feedback path from amplitude and phase calculation block 431 to VCO 416 or variable phase shifter 418 and thus may also lack a feedback low-pass filter 434. Thus, a phase measurement may still be made by comparing a change in phase to a reference phase value, but the oscillation frequency driven by VCO 416 may not be modified or the phase shifted by variable phase shifter 418 may not be shifted.

Although the foregoing contemplates use of a coherent incident/quadrature detector as a phase detector for determining phase information associated with resistive-inductive-capacitive sensor 402, a resonant phase sensing system 112 may perform phase detection and/or otherwise determine phase information associated with resistive-inductive-capacitive sensor 402 in any suitable manner, including, without limitation, using only one of the incident path or quadrature path to determine phase information.

In some embodiments, an incident/quadrature detector as disclosed herein may include one or more frequency translation stages that translate the sensor signal into direct-current signal directly or into an intermediate frequency signal and then into a direct-current signal. Any of such frequency translation stages may be implemented either digitally after an analog-to-digital converter stage or in analog before an analog-to-digital converter stage.

In addition, although the foregoing contemplates measuring changes in resistance and inductance in resistive-inductive-capacitive sensor 402 caused by displacement of mechanical member 305, other embodiments may operate based on a principle that any change in impedance based on displacement of mechanical member 305 may be used to sense displacement. For example, in some embodiments, displacement of mechanical member 305 may cause a change in a capacitance of resistive-inductive-capacitive sensor 402, such as if mechanical member 305 included a metal plate implementing one of the capacitive plates of capacitor 406.

Although DSP 432 may be capable of processing phase information to make a binary determination of whether physical interaction associated with a human-machine interface associated with mechanical member 305 has occurred and/or ceased to occur, in some embodiments, DSP 432 may quantify a duration of a displacement of mechanical member 305 to more than one detection threshold, for example to detect different types of physical interactions (e.g., a short press of a virtual button versus a long press of the virtual button). In these and other embodiments, DSP 432 may quantify a magnitude of the displacement to more than one detection threshold, for example to detect different types of physical interactions (e.g., a light press of a virtual button versus a quick and hard press of the virtual button).

Although FIG. 4 and the description thereof depicts particular embodiments of a resonant phase sensing system, other architectures for force sensing may be used consistent with this disclosure, including without limitation the various resonant phase sensing system architectures described in U.S. patent application Ser. No. 16/267,079, filed Feb. 4, 2019. Thus, while frequency and quality factor calculation engine 452 is discussed herein in relation to operation in connection with a resonant phase sensing system, frequency and quality factor calculation engine 452 may be used with any other suitable force sensing system.

Accordingly, using the systems and methods described above, a resistive-inductor-capacitive sensor is provided wherein part of the inductive component is exposed to the user in the form of a metal plate of a region of a chassis or enclosure (e.g., enclosure 101).

As such, displacements in the metal plate or enclosure may correlate to changes in measured phase or amplitude.

As mentioned in the Background section of this application, for an actively-driven sensor system, it may be desirable that a signal driver (e.g., voltage-to-current converter 408) generate a signal at the resonant frequency of the sensor. Due to manufacturing designs and tolerances as well as environmental effects (e.g., temperature, humidity, movements in air gap over time, other changes in mechanical structures, etc.), resonant frequency $f_0$ and/or quality factor Q of resistive-inductive-capacitive sensor 402 may be different from each individual sensor and may change over time. There are many reasons to operate resistive-inductive-capacitive sensor 402 at or near resonant frequency $f_0$, including without limitation:

As system 400 is a phase measurement system, the phase slope of the sensor may be approximately linear and may have its highest sensitivity close to resonant frequency $f_0$. Accordingly, operating with a carrier frequency of the driving signal at or near resonant frequency $f_0$ may optimize performance of system 400.

At frequencies away from resonant frequency $f_0$, a signal amplitude developed across resistive-inductive-capacitive sensor 402 may be reduced, due to a smaller impedance presented by resistive-inductive-capacitive sensor 402. This smaller signal amplitude may lead to a decrease in a signal-to-noise-ratio (SNR) of system 400.

Quality factor Q of resistive-inductive-capacitive sensor 402 may play a major role in translating the measured sensor signal ϕ into force. Measuring a changing quality factor Q over time may allow for system 400 to compensate for changes in a phase-to-force translation. (Compensation for changing quality factor Q is outside the scope of this disclosure).

Accordingly, as described in detail below, frequency and quality factor calculation engine 452 may be configured to determine resonant frequency $f_0$ and quality factor Q of resistive-inductive-capacitive sensor 402, and to adjust the drive frequency of a driving signal for resistive-inductive-capacitive sensor 402 (e.g., driven by voltage-to-current converter 408 accordingly). As a result, system 400 may measure relevant parameters, estimate changed values of the sensor parameters, and make some internal adjustments to "re-center" VCO 416 and drive circuitry of system 400 to the optimal values for resistive-inductive-capacitive sensor 402.

Figure 5:
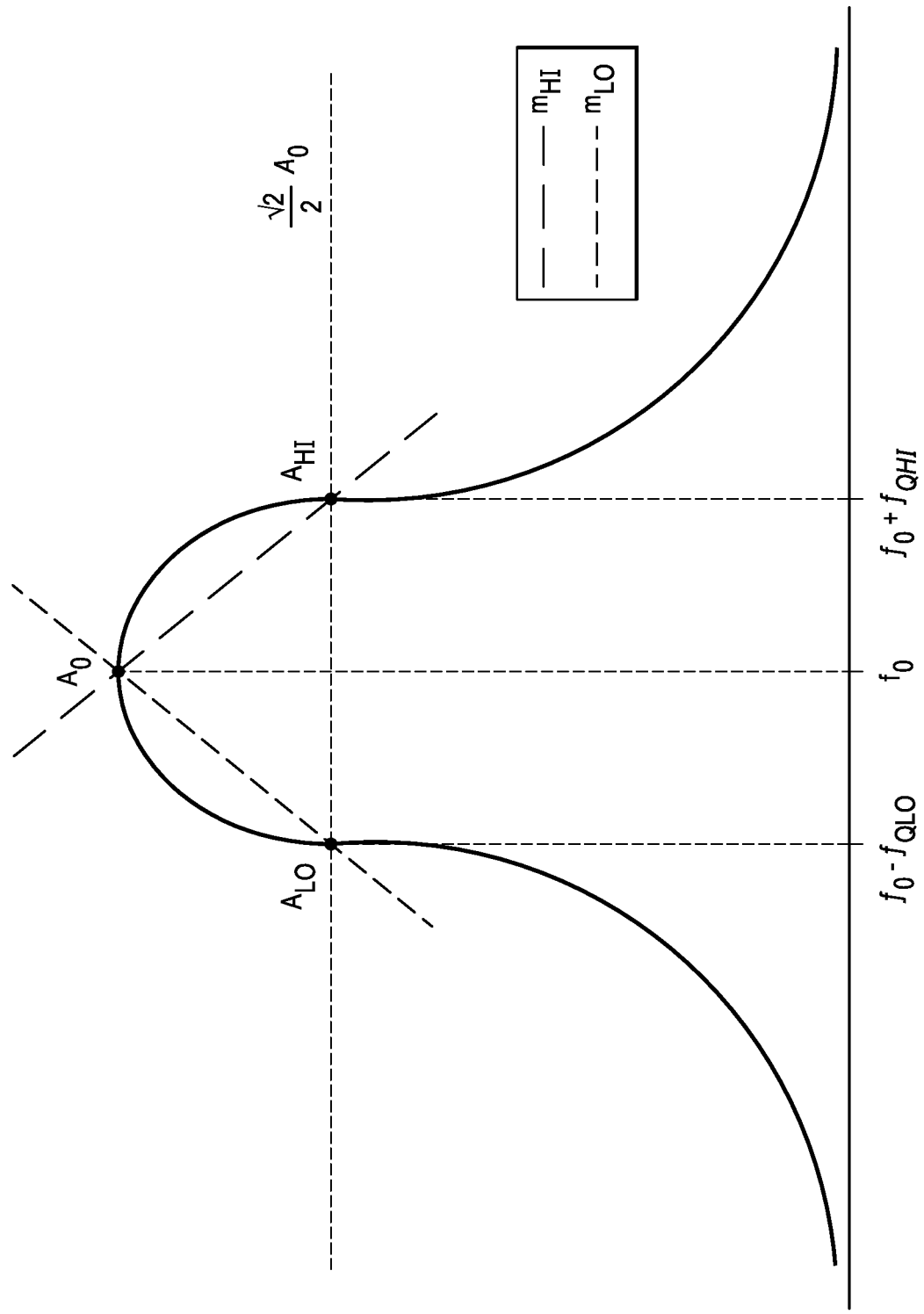
FIG. 5 illustrates an example graph of amplitude versus frequency for a resistive-inductive-capacitive sensor, in accordance with embodiments of the present disclosure.

The functionality of frequency and quality factor calculation engine 452 may be illustrated with respect to FIG. 5, which illustrates an example graph of amplitude versus frequency for resistive-inductive-capacitive sensor 402, in accordance with embodiments of the present disclosure. FIG. 5 depicts three samples of amplitude $A_0$, $A_{LO}$, and $A_{HI}$, taken at resonant frequency $f_0$, a frequency $f_0 - f_{QLO}$, and a frequency $f_0 + f_{QHI}$. Frequencies $f_0 - f_{QLO}$ and $f_0 + f_{QHI}$ may represent frequencies at which amplitudes $A_{LO}$ and $A_{HI}$ are three decibels lower than amplitude $A_0$ at resonant frequency $f_0$ $$\left( e.g., A_{L0} = A_{HI} = \frac{\sqrt{2}}{2} A_0. \right.$$

FIG. 5 also depicts a slope mm between the sample of amplitude $A_{LO}$ at frequency $f_0 - f_{QLO}$ and the sample of amplitude $A_0$ at resonant frequency $f_0$, and further depicts a slope $m_{HI}$ between the sample of amplitude $A_0$ at resonant frequency $f_0$ and sample of amplitude $A_{HI}$ at frequency $f_0 + f_{QHI}$. Slope $m_{LO}$ and slope min may be given as:

$$m_{LO} = \frac{A_0 - A_{LO}}{f_{QLO}}, m_{HI} = \frac{A_{HI} - A_0}{f_{QHI}}$$

If perfect symmetry is assumed for amplitude versus frequency about resonant frequency $f_0$, then $m_{LO} + m_{HI} = 0$, although such assumption may not be viable for a very low quality factor Q.

Taking actual values for slopes $m_{LO}$ and $m_{HI}$ from sensor models across multiple quality factors Q and resonant frequencies $f_0$, slopes $m_{LO}$ and $m_{HI}$ may be modeled in a linear equation as a function of quality factor Q as follows:

$$f_0 Q(m_{LO} + m_{HI}) \approx A_{peak}(m_Q Q + b_Q) \quad (1)$$

wherein $A_{peak}$ is a peak amplitude of the curve, $m_Q$ is a slope of the linear equation, and $b_Q$ is the y-intercept of the linear equation. Accordingly, if slopes $m_{LO}$ and $m_{HI}$ are scales with resonant frequency $f_0$ and quality factor Q, a result may be produced that is approximately linear with quality factor Q. Thus, frequency and quality factor calculation engine 452 may use linear curve fitting with sensor model data to find the slope $m_Q$ and y-intercept $b_Q$ of the linear model.

Once solving the linear model, frequency and quality factor calculation engine 452 may formulate equations for updating an estimate of resonant frequency $f_0$ based on the relationships above. In other words, updated slopes $m_{LO}$ and $m_{HI}$ may be given by:

$$m_{LO} = \frac{(A_0 + \Delta A_0) - A_{LO}}{\Delta f_0 + f_{QLO}}, \quad m_{HI} = \frac{(A_0 + \Delta A_0) - A_{HI}}{\Delta f_0 - f_{QHI}}$$

and resonant frequency $f_0$ may be updated by substituting updated slopes $m_{LO}$ and $m_{HI}$ into the linear model:

$$\Delta f_0 = \frac{f_{QHI}[(A_0 + \Delta A_0) - A_{LO}] - f_{QLO}[(A_0 + \Delta A_0) - A_{HI}] - \frac{f_{QHI} f_{QLO}}{f_0} A_0 \left(m_Q + b_Q \frac{f_Q}{f_0}\right)}{[(A_0 + \Delta A_0) - A_{LO}] + [(A_0 + \Delta A_0) - A_{HI}] + \frac{(f_{QHI} - f_{QLO})}{f_0} A_0 \left(m_Q + b_Q \frac{f_Q}{f_0}\right)}$$

where change in amplitude $A_0$ may be used to dampen a response from ringing between sampling iterations.

As mentioned above, to implement the estimation of resonant frequency $f_0$ and quality factor Q of resistive-inductive-capacitive sensor 402 as described herein, frequency and quality factor calculation engine 452 may take as few as three measurements of amplitude at three frequencies, as follows:

$$A_{LO}(f_{est} - f_{QLO}), A_0(f_{est}), A_{HI}(f_{est} + f_{QHI})$$

Once the estimation has converged, sample measurement $A_0(f_{est})$ may represent the amplitude at resonant frequency $f_0$, and sample measurements $A_{LO}(f_{est} - f_{QLO})$ and $A_{HI}(f_{est} + f_{QHI})$ may represent frequencies at which amplitude is 3 decibels less than amplitude $A_0$ at resonant frequency $f_0$.

Quality factor Q may then be given by:

$$Q = \frac{f_0}{f_Q}, \quad f_Q = f_{QHI} + f_{QLO}$$

Figure 6A:
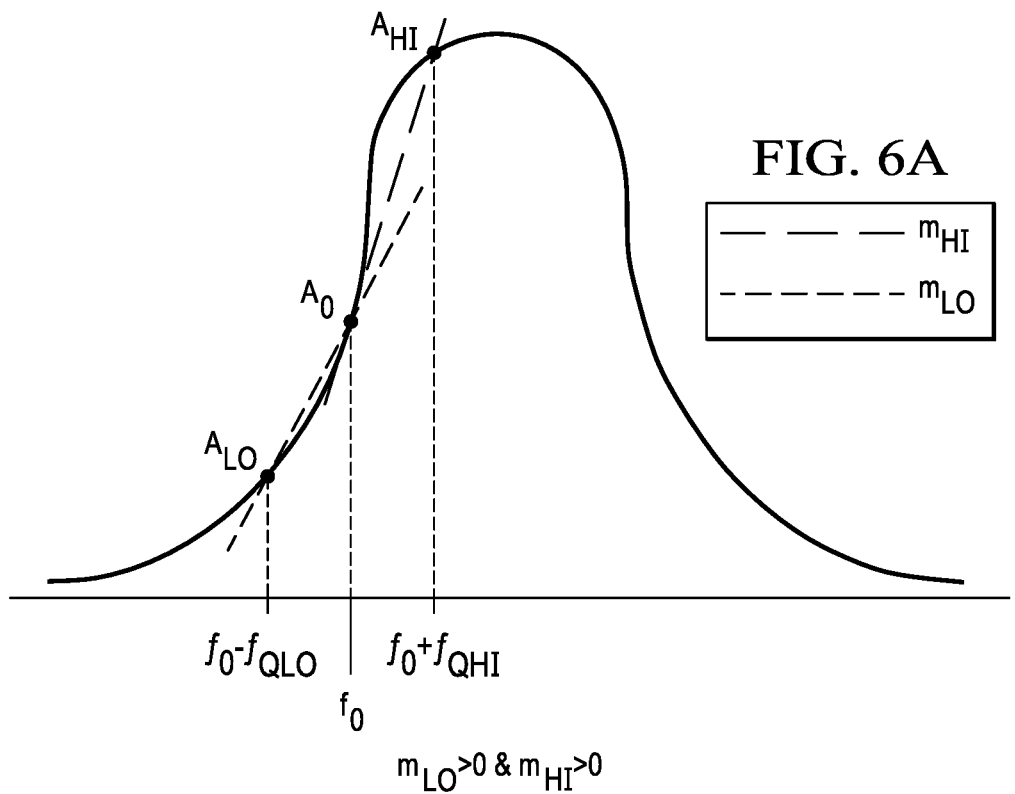
Figure 6B:
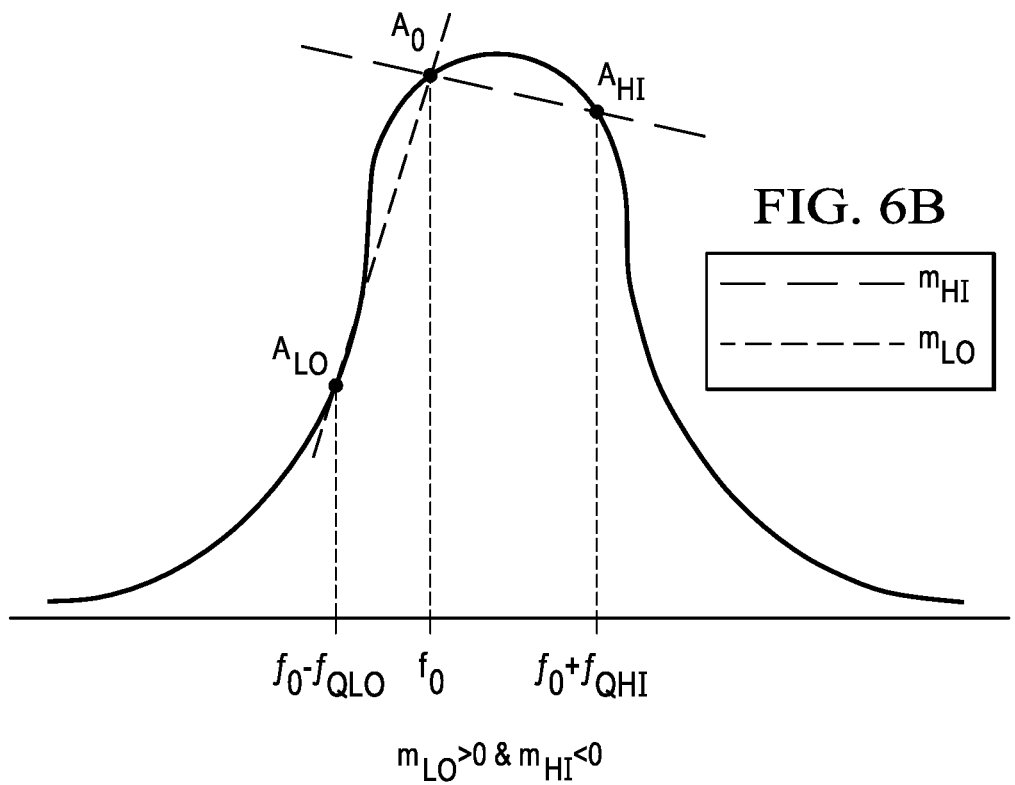
Figure 7:
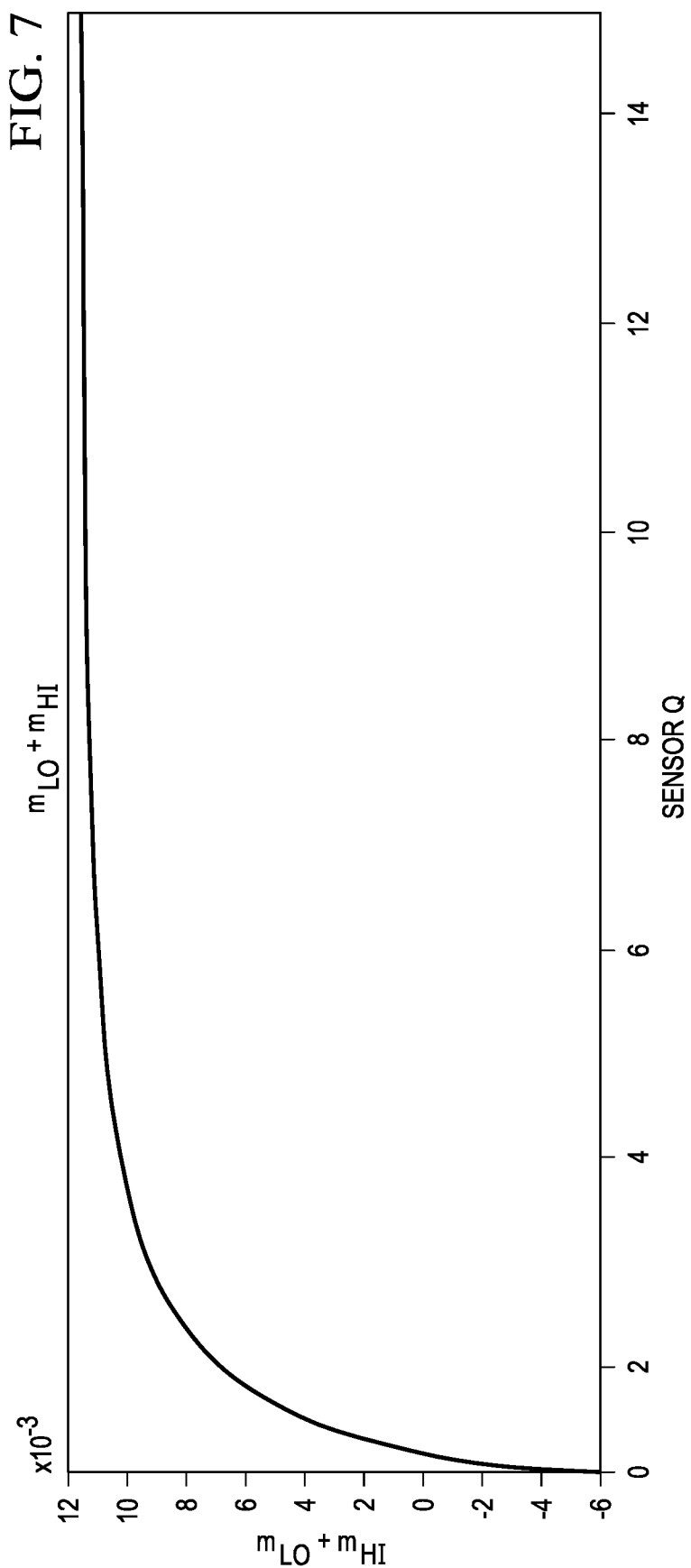
FIG. 7 illustrates an example graph of a sum of slopes versus a quality factor for a single resonant frequency of a resistive-inductive-capacitive sensor, in accordance with embodiments of the present disclosure.
Figure 8:
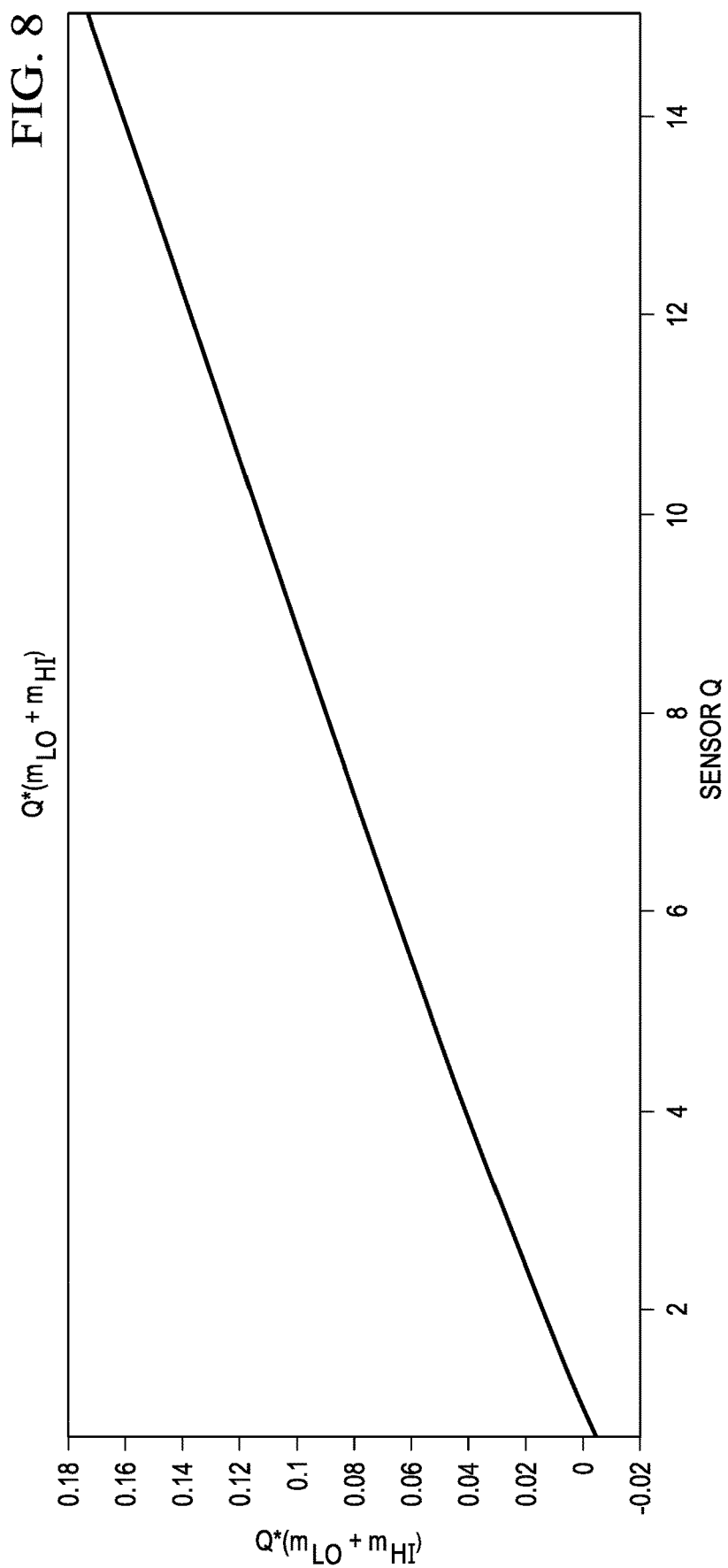
FIG. 8 illustrates an example graph of a linear model of a product of a quality factor of a resistive-inductive-capacitive sensor multiplied by a quantity of a sum of slopes determined from sampled measurement points of amplitude versus frequency, in accordance with embodiments of the present disclosure.

Given a typical response of resistive-inductive-capacitive sensor 402, it may determine a "direction" of a location of actual resonant frequency $f_0$ based on a slope between $A_{LO}(f_{est} - f_{QLO})$ and $A_0(f_{est})$ and a slope between $A_{HI}(f_{est} + f_{QHI})$ and $A_0(f_{est})$. For example, referring to FIGS. 6A-6C, which illustrate additional example graphs of amplitude versus frequency for resistive-inductive-capacitive sensor 402 in different possible amplitude response regions, in accordance with embodiments of the present disclosure:

When $m_{LO} > 0$ and $m_{HI} > 0$, resonant frequency $f_0 > f_{est} + f_{QHI}$ When $m_{LO} > 0$ and $m_{HI} < 0$, $f_{est} - f_{QLO} < f_0 < f_{est} + f_{QHI}$ When $m_{LO} > 0$ and $m_{HI} > 0$, resonant frequency $f_0 < f_{est} - f_{QLO}$ Further, it may be evident from FIG. 5 that if $m_{LO} > 0$ and $m_{HI} < 0$, the sum of $m_{LO}$ and $m_{HI}$ should approach zero as estimated frequency $f_{est}$ approaches resonant frequency $f_0$. However, as also mentioned above, assuming $m_{LO} + m_{HI} = 0$ at resonance may be a correct assumption for estimating resonant frequency $f_0$ for sensors with lower values of quality factor Q (e.g., Q<~6). To that end, FIG. 7 illustrates an example graph of the sum $m_{LO} + m_{HI}$ versus quality factor Q for a single resonant frequency, in accordance with embodiments of the present disclosure. The curve shown in FIG. 7 may be modeled as:

$$\frac{f_0 Q(m_{LO} + m_{HI})}{A_{peak}} \approx m_Q Q + b_Q \rightarrow m_{LO} + m_{HI} \approx \frac{A_{peak}}{f_0}\left(m_Q + \frac{b_Q}{Q}\right)$$

and thus, $Q(m_{LO} + m_{HI})$ may be modeled as approximately linear with a slope of $m_Q$ and a y-intercept of $b_Q$, as shown in FIG. 8.

To estimate resonant frequency $f_0$ and quality factor Q, sample measurements $A_0(f_{est})$, $A_{LO}(f_{est} - f_{QLO})$, and $A_{LO}(f_{est} + f_{QHI})$ may iteratively be taken, with estimated frequency $f_{est}$ updated for each iteration, eventually converging with resonant frequency $f_0$.

For example, for the case in which $mu > 0$ and $m_{HI} < 0$, estimated frequency fa may be updated by substituting $f_0 = f_{est}$ and $$Q = \frac{f_{est}}{f_Q}$$

into the linear model equation (1) from above, which yields:

$$\frac{f_{est}^2}{f_Q}(m_{LO} + m_{HI}) = A_0\left(m_Q \frac{f_{est}}{f_Q} + b_Q\right) \quad (2)$$

wherein $A_0$ is substituted for peak amplitude $A_{peak}$.

Further, slopes $m_{LO}$ and $m_{HI}$ may be updated in accordance with:

$$m_{LO} = \frac{(A_0 + \Delta A_0) - A_{LO}}{\Delta f_{est} + f_{QLO}}, \quad m_{HI} = \frac{(A_0 + \Delta A_0) - A_{HI}}{\Delta f_{est} - f_{QHI}}$$

and substituted into equation (2), which yields:

$$\frac{f_{est}^2}{f_Q}\left[\frac{(A_0 + \Delta A_0) - A_{LO}}{\Delta f_{est} + f_{QLO}} + \frac{(A_0 + \Delta A_0) - A_{HI}}{\Delta f_{est} - f_{QHI}}\right] = A_0\left(m_Q \frac{f_{est}}{f_Q} + b_Q\right) \quad (3)$$

By collecting like terms from equation (3) and assuming $\Delta f_{est}^2 \approx 0$, frequency and quality factor calculation engine 452 may solve for a delta update $\Delta f_{est}$ in estimated frequency $f_{est}$ as:

$$\Delta f_{est} = \frac{f_{QHI}[(A_0 + \Delta A_0) - A_{LO}] - }{[(A_0 + \Delta A_0) - A_{LO}] + }$$
$$\frac{f_{QLO}[(A_0 + \Delta A_0) - A_{HI}] - \frac{f_{QHI} f_{QLO}}{f_{est}} A_0 \left(m_Q + b_Q \frac{f_Q}{f_{est}}\right)}{[(A_0 + \Delta A_0) - A_{HI}] + \frac{(f_{QHI} - f_{QLO})}{f_{est}} A_0 \left(m_Q + b_Q \frac{f_Q}{f_{est}}\right)}$$

A change $\Delta A_0$ in amplitude may be dampened by the relation as $\Delta A_0 = \lambda |A_{HI} - A_{LO}|$, where $\lambda$ is a parameter between 0 and 1 that may control an amount of dampening.

After updating estimated frequency $f_{est}$ by delta update $\Delta f_{est}$, frequency and quality factor calculation engine 452 may update sum $f_Q$ of frequencies $f_{QLO}$ and $f_{QHI}$, with the goal of updating frequencies $f_{QLO}$ and $f_{QHI}$ to the points at which $$A_{LO} = A_{HI} = \frac{\sqrt{2}}{2} A_0.$$

Assuming perfect symmetry about resonant frequency $f_0$:

$$m_{LO} + m_{HI} = 0 \rightarrow \frac{A_0 - A_{LO}}{\Delta f_0 + f_{QLO}} + \frac{A_0 - A_{HI}}{\Delta f_0 - f_{QHI}} = 0 \text{ and:}$$

$$\Delta f_{est} = \frac{f_{QHI}(A_0 - A_{LO}) - f_{QLO}(A_0 - A_{HI})}{(A_0 - A_{LO}) + (A_0 - A_{HI})}$$

Thus, frequency $f_{QLO}$ may be updated by a delta frequency $\Delta f_{QLO}$ in accordance with:

$$\frac{\sqrt{2}}{2} A_0 - A_{LO} = m_{LO}(\Delta f_{est} - \Delta f_{QLO}) \text{ and:}$$

$$m_{LO} = \frac{A_0 - A_{LO}}{\Delta f_{est} + f_{QLO}} \rightarrow m_{LO} =$$

$$\frac{A_0 - A_{LO}}{\left[\frac{f_{QHI}(A_0 - A_{LO}) - f_{QLO}(A_0 - A_{HI})}{(A_0 - A_{LO}) + (A_0 - A_{HI})}\right] + f_{QLO}} \rightarrow m_{LO} =$$

$$\frac{(A_0 - A_{LO}) + (A_0 - A_{HI})}{f_{QHI} + f_{QLO}}$$

By substitution of slope $m_{LO}$ and delta frequency $\Delta f_{est}$ to solve for delta frequency $\Delta f_{QLO}$:

$$\Delta f_{QLO} = \Delta f_{est} - \frac{(f_{QHI} + f_{QLO})\left(\frac{\sqrt{2}}{2} A_0 - A_{LO}\right)}{(A_0 - A_{LO}) + (A_0 - A_{HI})}$$

Similarly, frequency $f_{QHI}$ may be updated by a delta frequency $\Delta f_{QHI}$ in accordance with:

$$\frac{\sqrt{2}}{2} A_0 - A_{HI} = m_{HI}(\Delta f_{est} + \Delta f_{QHI}) \text{ and :}$$

$$m_{HI} = \frac{A_0 - A_{HI}}{\Delta f_{est} - f_{QHI}} \rightarrow m_{HI} =$$

$$\frac{A_0 - A_{HI}}{\left[\frac{f_{QHI}(A_0 - A_{LO}) - f_{QLO}(A_0 - A_{HI})}{(A_0 - A_{LO}) + (A_0 - A_{HI})}\right] - f_{QHI}} \rightarrow m_{HI} =$$

$$\frac{-[(A_0 - A_{LO}) + (A_0 - A_{HI})]}{f_{QHI} + f_{QLO}}$$

By substitution of slope $m_{HI}$ and delta frequency $\Delta f_{est}$ to solve for delta frequency $\Delta f_{QHI}$:

$$\Delta f_{QHI} = -\Delta f_{est} - \frac{(f_{QHI} + f_{QLO})\left(\frac{\sqrt{2}}{2} A_0 - A_{HI}\right)}{(A_0 - A_{LO}) + (A_0 - A_{HI})}$$

Figure 9:
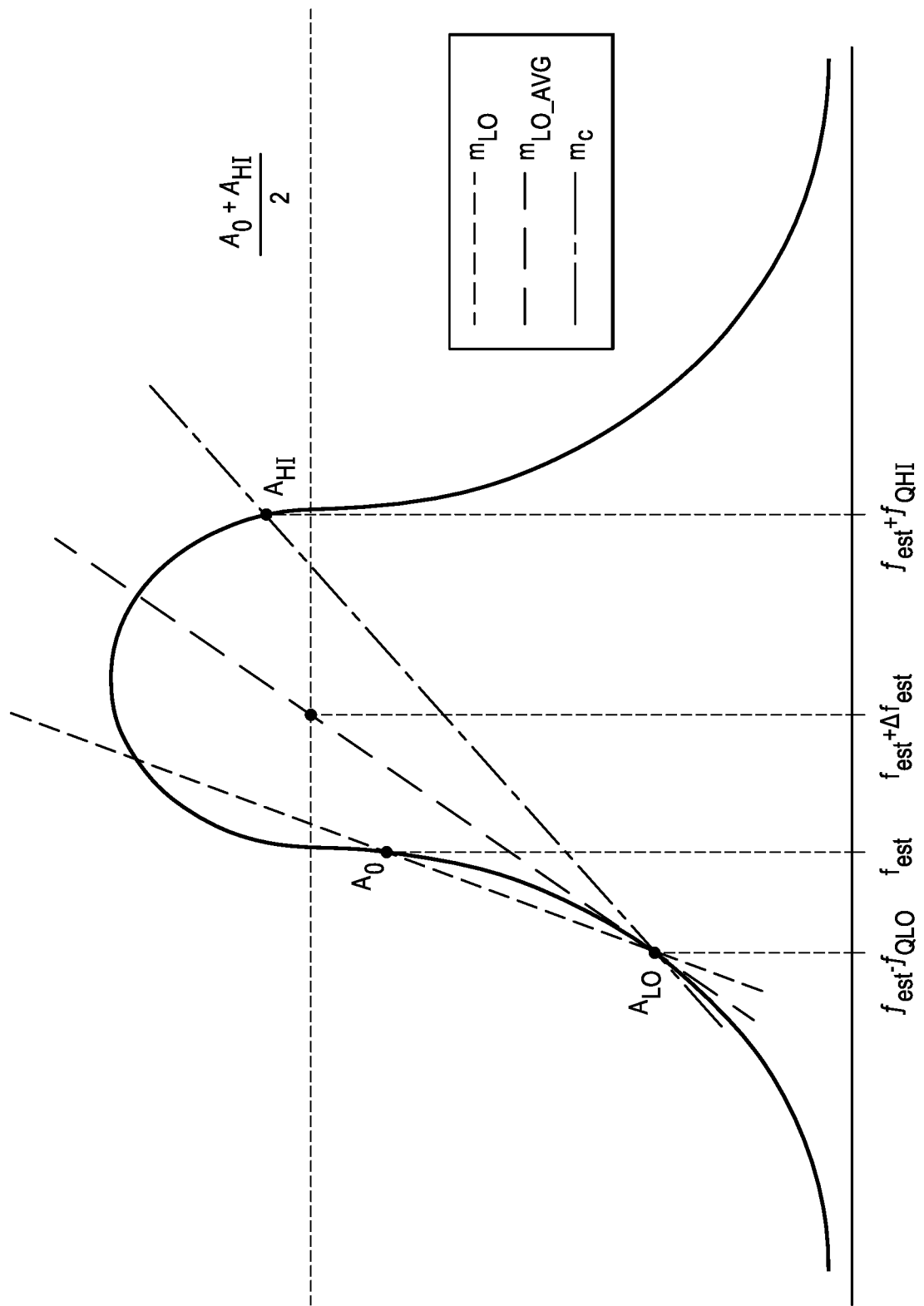
FIG. 9 illustrates an example graph of amplitude versus frequency for a resistive-inductive-capacitive sensor with measurement samples taken below an actual resonant frequency, in accordance with embodiments of the present disclosure.

As another example, for the case in which $m_{HI} > 0$ as shown in FIG. 9, it may be safe to assume that resonant frequency $f_0$ is higher than estimated frequency $f_{est}$. In such case, frequency and quality factor calculation engine 452 may update estimated frequency $f_{est}$ by first calculating a new slope $m_{LO\_AVG}$ by taking the average of slope $m_{LO}$ between sample points ($f_{est}-f_{QLO}$, $A_{LO}$) and ($f_{est}$, $A_0$) and slope mc between sample points ($f_{est}-f_{QLO}$, $A_{LO}$) and ($f_{est}+f_{QHI}$, $A_{HI}$). A line equation with this average slope $m_{LO\_AVG}$ may be used by frequency and quality factor calculation engine 452 to find a new estimated frequency at an amplitude between $A_0$ and $A_{HI}$, for example at a point ($f_{est}+\Delta f_{est}$, $0.5(A_0+A_{HI})$) on the amplitude versus frequency curve, resulting in a new frequency estimation between the existing estimated frequency $f_{est}$ and frequency $f_{est}+f_{QHI}$.

To further illustrate, under such approach, frequency and quality factor calculation engine 452 may calculate average slope $m_{LO\_AVG}$ as:

$$m_{LO_{AVG}} = \frac{1}{2}[m_{LO} + m_C] =$$

$$\frac{1}{2}\left[\frac{A_0 - A_{LO}}{f_{QLO}} + \frac{A_{HI} - A_{LO}}{f_{QHI} + f_{QLO}}\right] = \frac{1}{2}\left[\frac{f_{QLO}(A_{HI} - A_{LO}) + (f_{QHI} + f_{QLO})(A_0 - A_{LO})}{f_{QLO}(f_{QHI} + f_{QLO})}\right]$$

An equation of a line with slope $m_{LO\_AVG}$ through points ($f_{est}-f_{QLO}$, $A_{LO}$) and point ($f_{est}+\Delta f_{est}$, $0.5(A_0+A_{HI})$) may be given by:

$$\frac{A_{HI} + A_0}{2} - A_{LO} = m_{LO_{AVG}}[(f_{est} + \Delta f_{est}) - (f_{est} - f_{QLO})]$$

Substituting the equation for slope $m_{LO\_AVG}$ into the foregoing equation and solving for delta frequency $\Delta f_{est}$:

$$\Delta f_{est} = \frac{f_{QLO}(f_{QHI} + f_{QLO})(A_{HI} + A_0 - 2A_{LO})}{f_{QLO}(A_{HI} - A_{LO}) + (f_{QHI} + f_{QLO})(A_0 - A_{LO})} - f_{QLO}$$

Figure 10:
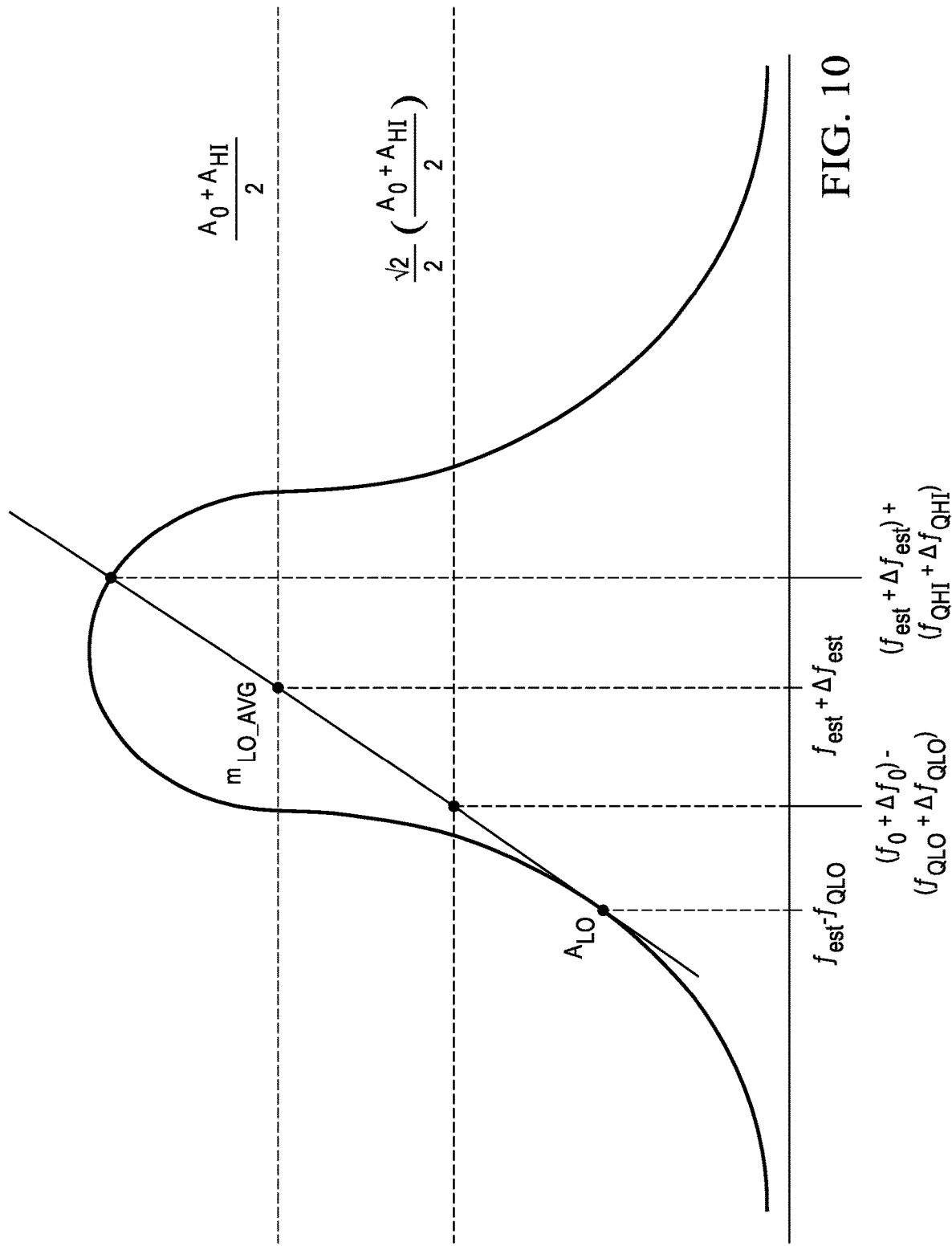
FIG. 10 illustrates an example graph of amplitude versus frequency depicting an approach for determining updated measurement sampling frequencies, in accordance with embodiments of the present disclosure.

As shown in FIG. 10, to update frequency $f_{QLO}$, the line described above with slope $m_{LO\_AVG}$ may be evaluated at a new frequency for frequency $f_{QLO}$ at which amplitude is $$\frac{\sqrt{2}}{2}\frac{(A_0 + A_{HI})}{2}.$$

Further, frequency $f_{QHI}$ may be updated such that frequency $f_{QLO}$ and frequency $f_{QHI}$ are symmetrical around the new estimated frequency $f_{est}+\Delta f_{est}$.

To further illustrate, an equation of a line may be given by:

$$\left(\frac{\sqrt{2}}{2} - 1\right)\frac{A_{HI} + A_0}{2} = $$
$$m_{LO_{AVG}}[(f_{est} + \Delta f_{est}) - (f_{QLO} + \Delta f_{QLO}) - (f_{est} + \Delta f_{est})]$$

Substituting the equation for slope $m_{LO\_AVG}$ into the foregoing equation and solving for delta frequency $\Delta f_{QLO}$:

$$\Delta f_{QLO} = \frac{f_{QLO}(f_{QHI} + f_{QLO})\left(1 - \frac{\sqrt{2}}{2}\right)(A_0 + A_{HI})}{f_{QLO}(A_{HI} - A_{LO}) + (f_{QHI} + f_{QLO})(A_0 - A_{LO})} - f_{QLO}$$

Similarly, solving for delta frequency $\Delta f_{QLO}$:

$$\Delta f_{QHI} = \frac{f_{QLO}(f_{QHI} + f_{QLO})\left(1 - \frac{\sqrt{2}}{2}\right)(A_0 + A_{HI})}{f_{QLO}(A_{HI} - A_{LO}) + (f_{QHI} + f_{QLO})(A_0 - A_{LO})} - f_{QHI}$$

Figure 11:
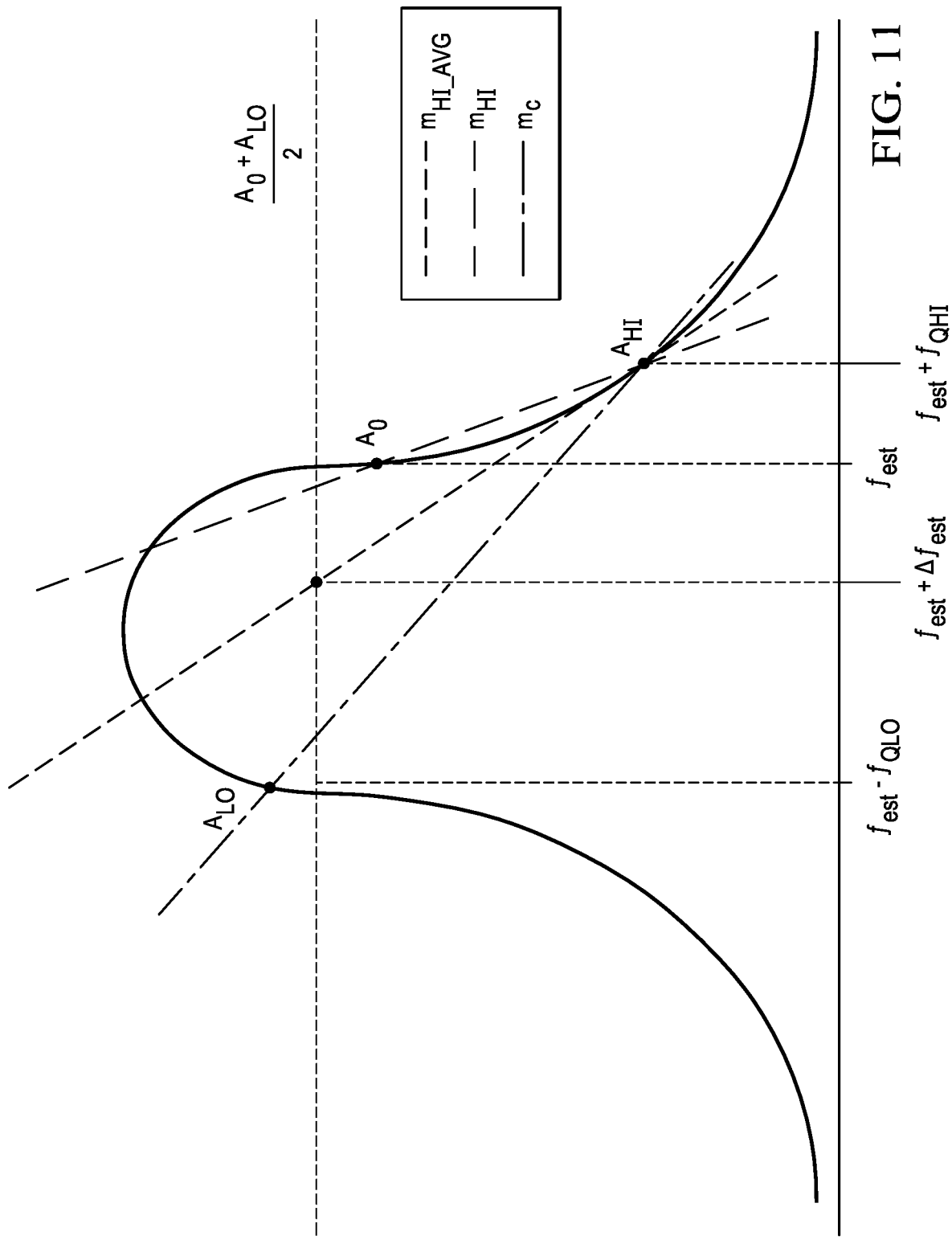
FIG. 11 illustrates an example graph of amplitude versus frequency for a resistive-inductive-capacitive sensor with measurement samples taken above an actual resonant frequency, in accordance with embodiments of the present disclosure.

As a further example, for the case in which $m_{LO}<0$ as shown in FIG. 11, it may be safe to assume that resonant frequency $f_0$ is lower than estimated frequency $f_{est}$. In such case, frequency and quality factor calculation engine 452 may update estimated frequency $f_{est}$ by first calculating a new slope $m_{HI\_AVG}$ by taking the average of slope mm between sample points $(f_{est}+f_{QHI}, A_{HI})$ and $(f_{est}, A_0)$ and slope mc between sample points $(f_{est}-f_{QLO}, A_{LO})$ and $(f_{est}+f_{QHI}, A_{HI})$. A line equation with this average slope $m_{HI\_AVG}$ may be used by frequency and quality factor calculation engine 452 to find a new estimated frequency at an amplitude between $A_0$ and $A_{LO}$, for example at a point $(f_{est}+\Delta f_{est}, 0.5(A_0+A_{LO}))$ on the amplitude versus frequency curve, resulting in a new frequency estimation between the existing estimated frequency $f_{est}$ and frequency $f_{est}-f_{QLO}$.

To further illustrate, under such approach, frequency and quality factor calculation engine 452 may calculate average slope $m_{HI\_AVG}$ as:

$$m_{HI_{AVG}} = \frac{1}{2}[m_{HI} + m_C] = $$
$$\frac{1}{2}\left[\frac{A_{HI} - A_0}{f_{QHI}} + \frac{A_{HI} - A_{LO}}{f_{QHI} + f_{QLO}}\right] = \frac{1}{2}\left[\frac{f_{QHI}(A_{HI} - A_{LO}) + (f_{QHI} + f_{QLO})(A_{HI} - A_0)}{f_{QHI}(f_{QHI} + f_{QLO})}\right]$$

An equation of a line with slope $m_{HI\_AVG}$ through points $(f_{est}+f_{QHI}, A_{HI})$ and point $(f_{est}+\Delta f_{est}, 0.5(A_0+A_{LO}))$ may be given by:

$$\frac{A_{LO} + A_0}{2} - A_{HI} = m_{HI_{AVG}}[(f_{est} + \Delta f_{est}) - (f_{est} + f_{QHI})]$$

Substituting the equation for slope $m_{HI\_AVG}$ into the foregoing equation and solving for delta frequency $\Delta f_{est}$:

$$\Delta f_{est} = \frac{f_{QHI}(f_{QHI} + f_{QLO})(A_{LO} + A_0 - 2A_{HI})}{f_{QHI}(A_{HI} - A_{LO}) + (f_{QHI} + f_{QLO})(A_{HI} - A_0)} + f_{QHI}$$

Figure 12:
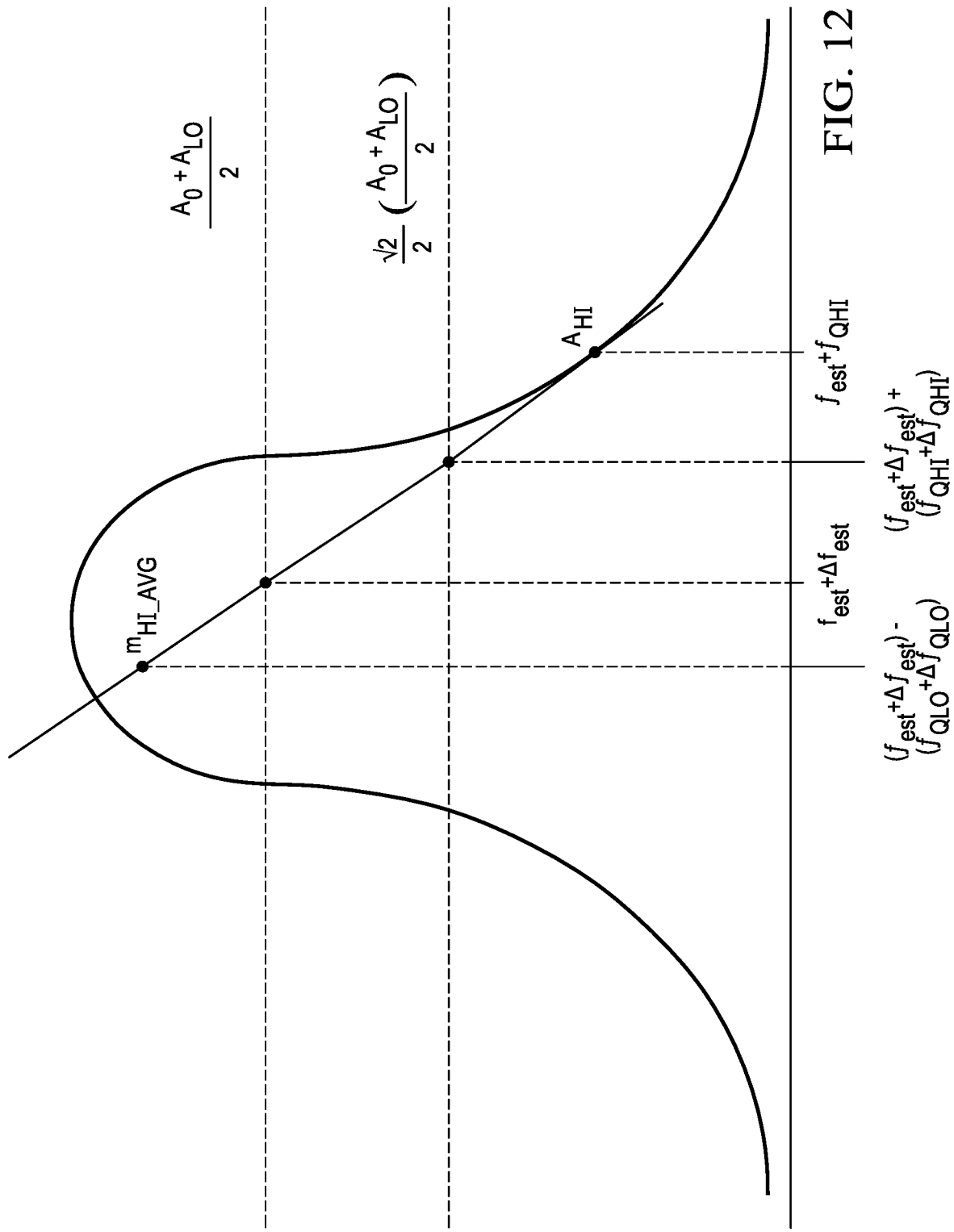
FIG. 12 illustrates an example graph of amplitude versus frequency depicting an approach for determining update measurement sampling frequencies, in accordance with embodiments of the present disclosure.

As shown in FIG. 12, to update frequency $f_{QHI}$, the line described above with slope $m_{HI\_AVG}$ may be evaluated at a new frequency for frequency $f_{QHI}$ at which amplitude is $$\frac{\sqrt{2}}{2}\frac{(A_0 + A_{LO})}{2}.$$

Further, frequency $f_{QLO}$ may be updated such that frequency $f_{QLO}$ and frequency $f_{QHI}$ are symmetrical around the new estimated frequency $f_{est}+\Delta f_{est}$.

To further illustrate, an equation of a line may be given by:

$$\left(\frac{\sqrt{2}}{2} - 1\right)\frac{A_{LO} + A_0}{2} = m_{HI_{AVG}}[(f_{est} + \Delta f_{est}) + (f_{QHI} + \Delta f_{QHI}) - (f_0 + \Delta f_0)]$$

Substituting the equation for slope $m_{HI\_AVG}$ into the foregoing equation and solving for delta frequency $\Delta f_{QHI}$:

$$\Delta f_{QHI} = \frac{f_{QHI}(f_{QHI} + f_{QLO})\left(\frac{\sqrt{2}}{2} - 1\right)(A_{LO} + A_0)}{f_{QHI}(A_{HI} - A_{LO}) + (f_{QHI} + f_{QLO})(A_{HI} - A_0)} - f_{QHI}$$

Similarly, solving for delta frequency $\Delta f_{QLO}$:

$$\Delta f_{QLO} = \frac{f_{QHI}(f_{QHI} + f_{QLO})\left(\frac{\sqrt{2}}{2} - 1\right)(A_{LO} + A_0)}{f_{QHI}(A_{HI} - A_{LO}) + (f_{QHI} + f_{QLO})(A_{HI} - A_0)} - f_{QLO}$$

To ultimately estimate resonant frequency $f_0$, frequency and quality factor calculation engine 452 may iteratively perform the above-described steps of sampling amplitude versus frequency at as few as three points including an estimated resonant frequency $f_{est}$, updating the frequencies (including estimated resonant frequency $f_{est}$) based on the measurements, and repeating these steps until estimated resonant frequency $f_{est}$ converges (e.g., successive changes between estimated resonant frequency $f_{est}$ fall below a threshold value).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method for determining sensor parameters of an actively-driven sensor system, comprising:
    obtaining as few as three samples of a measured physical quantity versus frequency for the actively-driven sensor system;
    performing a refinement operation to provide a refined version of the sensor parameters based on the as few as three samples and based on a linear model of an asymmetry between slopes of the measured physical quantity versus frequency between pairs of the as few as three samples;
    iteratively repeating the refinement operation until the difference between successive refined versions of the sensor parameters is below a defined threshold; and
    outputting the refined sensor parameters as updated sensor parameters for the actively-driven sensor system.

2. The method of claim 1, wherein the sensor parameters comprise one or more of a resonant frequency and a quality factor of the actively-driven sensor system.

3. The method of claim 1, wherein the measured physical quantity comprises an amplitude associated with the actively-driven sensor system.

4. The method of claim 1, wherein the as few as three samples are obtained at:
    a first frequency estimating a resonant frequency of the actively-driven sensor system;
    a second frequency lower than the first frequency; and
    a third frequency higher than the first frequency.

5. The method of claim 4, wherein a first difference between the third frequency and the first frequency is approximately equal to a second difference between the first frequency and the second frequency.

6. The method of claim 5, wherein slopes of the measured physical quantity versus frequency between pairs of the as few as three samples comprise:
    a first slope between a first sample obtained at the first frequency and a second sample obtained at the second frequency; and
    a second slope between the first sample and a third sample obtained at the third frequency.

7. The method of claim 6, wherein the refinement operation comprises, when the first slope is positive and the second slope is negative:
    increasing the first frequency for a subsequent iteration if a magnitude of the first slope is greater than a magnitude of the second slope; and
    decreasing the first frequency for the subsequent iteration if a magnitude of the first slope is lesser than a magnitude of the second slope.

8. The method of claim 6, wherein the refined version of the sensor parameters is based on the first slope and the second slope.

9. The method of claim 6, wherein the refinement operation comprises, when the second slope is positive, increasing the first frequency for a subsequent iteration.

10. The method of claim 9, wherein the refinement operation comprises increasing the first frequency to a frequency between the first frequency and the third frequency.

11. The method of claim 6, wherein the refinement operation comprises, when the first slope is negative, increasing the first frequency for a subsequent iteration.

12. The method of claim 11, wherein the refinement operation comprises decreasing the first frequency to a frequency between the first frequency and the second frequency.

13. The method of claim 4, wherein the second frequency and the third frequency each estimate frequencies at which an amplitude of the physical quantity is three decibels lower than the amplitude at the resonant frequency.

14. The method of claim 1, wherein the as few as three samples of the measured physical quantity are based on a previous iteration of the refinement operation.

15. The method of claim 1, wherein the actively-driven sensor system comprises a force sensor.

16. The method of claim 15, wherein the force sensor is configured to sense a force associated with a human interaction with a virtual button.

17. The method of claim 16, wherein the force sensor comprises one of a capacitive displacement sensor, an inductive force sensor, a resistive-inductive-capacitive sensor, a strain gauge, a piezoelectric force sensor, a force sensing resistor, a piezoelectric force sensor, a thin film force sensor, or a quantum tunneling composite-based force sensor.

18. The method of claim 1, wherein the actively-driven sensor system comprises a resistive-inductive-capacitive sensor.

19. A system comprising:
an actively-driven sensor; and
a measurement circuit communicatively coupled to the actively-driven sensor and configured to:
obtain as few as three samples of a measured physical quantity versus frequency for the actively-driven sensor;
perform a refinement operation to provide a refined version of the sensor parameters based on the as few as three samples and based on a linear model of an asymmetry between slopes of the measured physical quantity versus frequency between pairs of the as few as three samples;
iteratively repeat the refinement operation until the difference between successive refined versions of the sensor parameters is below a defined threshold; and
output the refined sensor parameters as updated sensor parameters for the actively-driven sensor.

20. The system of claim 19, wherein the sensor parameters comprise one or more of a resonant frequency and a quality factor of the actively-driven sensor.

21. The system of claim 19, wherein the measured physical quantity comprises an amplitude associated with the actively-driven sensor.

22. The system of claim 19, wherein the as few as three samples are obtained at:
a first frequency estimating a resonant frequency of the actively-driven sensor;
a second frequency lower than the first frequency; and
a third frequency higher than the first frequency.

23. The system of claim 22, wherein a first difference between the third frequency and the first frequency is approximately equal to a second difference between the first frequency and the second frequency.

24. The system of claim 23, wherein slopes of the measured physical quantity versus frequency between pairs of the as few as three samples comprise:
a first slope between a first sample obtained at the first frequency and a second sample obtained at the second frequency; and
a second slope between the first sample and a third sample obtained at the third frequency.

25. The system of claim 24, wherein the refinement operation comprises, when the first slope is positive and the second slope is negative:
increasing the first frequency for a subsequent iteration if a magnitude of the first slope is greater than a magnitude of the second slope; and
decreasing the first frequency for the subsequent iteration if a magnitude of the first slope is lesser than a magnitude of the second slope.

26. The system of claim 24, wherein the refined version of the sensor parameters is based on the first slope and the second slope.

27. The system of claim 24, wherein the refinement operation comprises, when the second slope is positive, increasing the first frequency for a subsequent iteration.

28. The system of claim 27, wherein the refinement operation comprises increasing the first frequency to a frequency between the first frequency and the third frequency.

29. The system of claim 24, wherein the refinement operation comprises, when the first slope is negative, increasing the first frequency for a subsequent iteration.

30. The system of claim 29, wherein the refinement operation comprises decreasing the first frequency to a frequency between the first frequency and the second frequency.

31. The system of claim 22, wherein the second frequency and the third frequency each estimate frequencies at which an amplitude of the physical quantity is three decibels lower than the amplitude at the resonant frequency.

32. The system of claim 19, wherein the as few as three samples of the measured physical quantity are based on a previous iteration of the refinement operation.

33. The system of claim 19, wherein the actively-driven sensor comprises a force sensor.

34. The system of claim 33, wherein the force sensor is configured to sense a force associated with a human interaction with a virtual button.

35. The system of claim 34, wherein the force sensor comprises one of a capacitive displacement sensor, an inductive force sensor, a resistive-inductive-capacitive sensor, a strain gauge, a piezoelectric force sensor, a force sensing resistor, a piezoelectric force sensor, a thin film force sensor, or a quantum tunneling composite-based force sensor.

36. The system of claim 19, wherein the actively-driven sensor comprises a resistive-inductive-capacitive sensor.

* * * * *